(12) United States Patent
Hiranuma

(10) Patent No.: US 11,194,310 B2
(45) Date of Patent: Dec. 7, 2021

(54) CONTROL SYSTEM

(71) Applicant: FANUC CORPORATION, Yamanashi (JP)

(72) Inventor: Takuya Hiranuma, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 53 days.

(21) Appl. No.: 16/806,388

(22) Filed: Mar. 2, 2020

(65) Prior Publication Data

US 2020/0285219 A1 Sep. 10, 2020

(30) Foreign Application Priority Data

Mar. 4, 2019 (JP) .............................. JP2019-038725

(51) Int. Cl.
| | |
|---|---|
| G05B 19/4093 | (2006.01) |
| G05B 19/4063 | (2006.01) |
| G05B 19/408 | (2006.01) |
| G05B 19/4155 | (2006.01) |

(52) U.S. Cl.
CPC ... *G05B 19/40938* (2013.01); *G05B 19/4063* (2013.01); *G05B 19/4086* (2013.01); *G05B 19/4155* (2013.01); *G05B 2219/31261* (2013.01)

(58) Field of Classification Search
None
See application file for complete search history.

(56) References Cited

U.S. PATENT DOCUMENTS

| | | | | |
|---|---|---|---|---|
| 8,847,965 B2* | 9/2014 | Chandak | ................... | H04S 7/30 345/473 |
| 2004/0216079 A1* | 10/2004 | Hunt | ....................... | G06F 30/30 716/102 |

FOREIGN PATENT DOCUMENTS

JP      2019-12342      1/2019

OTHER PUBLICATIONS

Wang et al., "A tree-based decision method for the configuration design of reconfigurable machine tools", Elsevier 2018 (Year: 2018).*

\* cited by examiner

*Primary Examiner* — Carlos R Ortiz Rodriguez
(74) *Attorney, Agent, or Firm* — Wenderoth, Lind & Ponack, L.L.P.

(57) ABSTRACT

To reduce wasteful memory consumption as compared with prior art in the case of a greater number of machine configuration trees subjected to switching by a numerical control device. A control system for an industrial machine including a machine configuration editing device and a machine configuration management device is configured to represent a machine configuration to be controlled in a graph-like machine configuration tree having constituent elements as nodes. The machine configuration editing device acquires machine configuration data for generating the machine configuration tree. The machine configuration management device includes a machine configuration tree generation portion configured to generate a plurality of the machine configuration trees on the basis of the machine configuration data and a node information change portion configured to generate a single machine configuration tree having a branch node set at a position corresponding to a boundary between common nodes and different nodes in the plurality of machine configuration trees and having the different nodes in the plurality of machine configuration trees so as to branch from the branch node toward tips.

8 Claims, 31 Drawing Sheets

FIG. 1
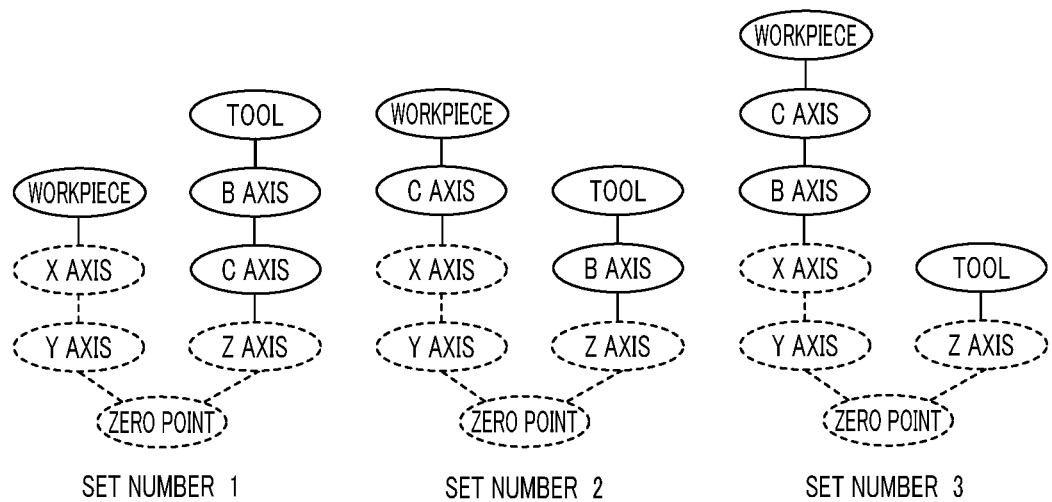
NUMBER OF NODES 24
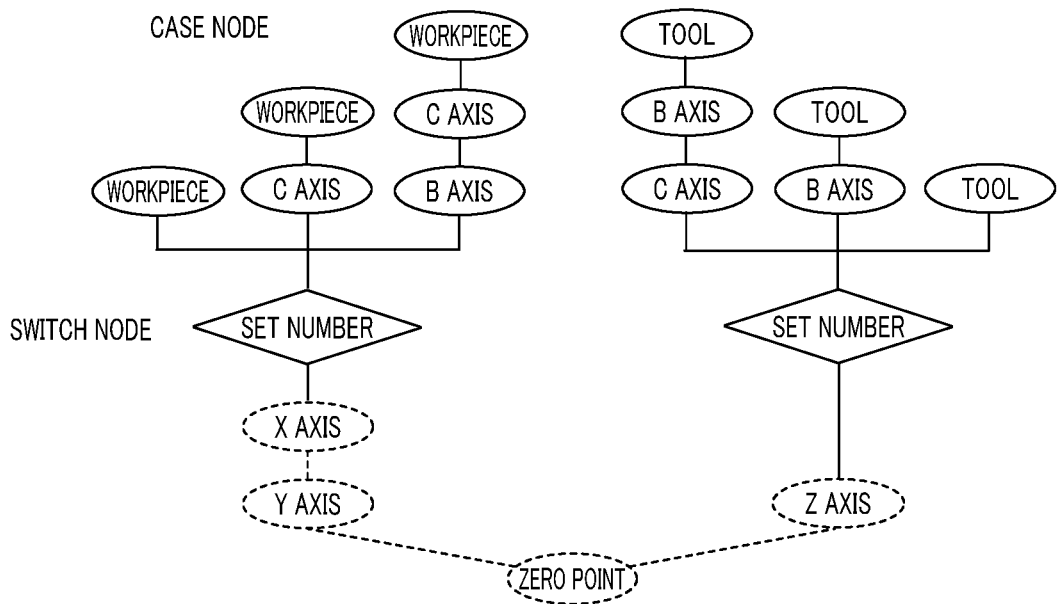
NUMBER OF NODES 18

MACHINE CONFIGURATION TREE

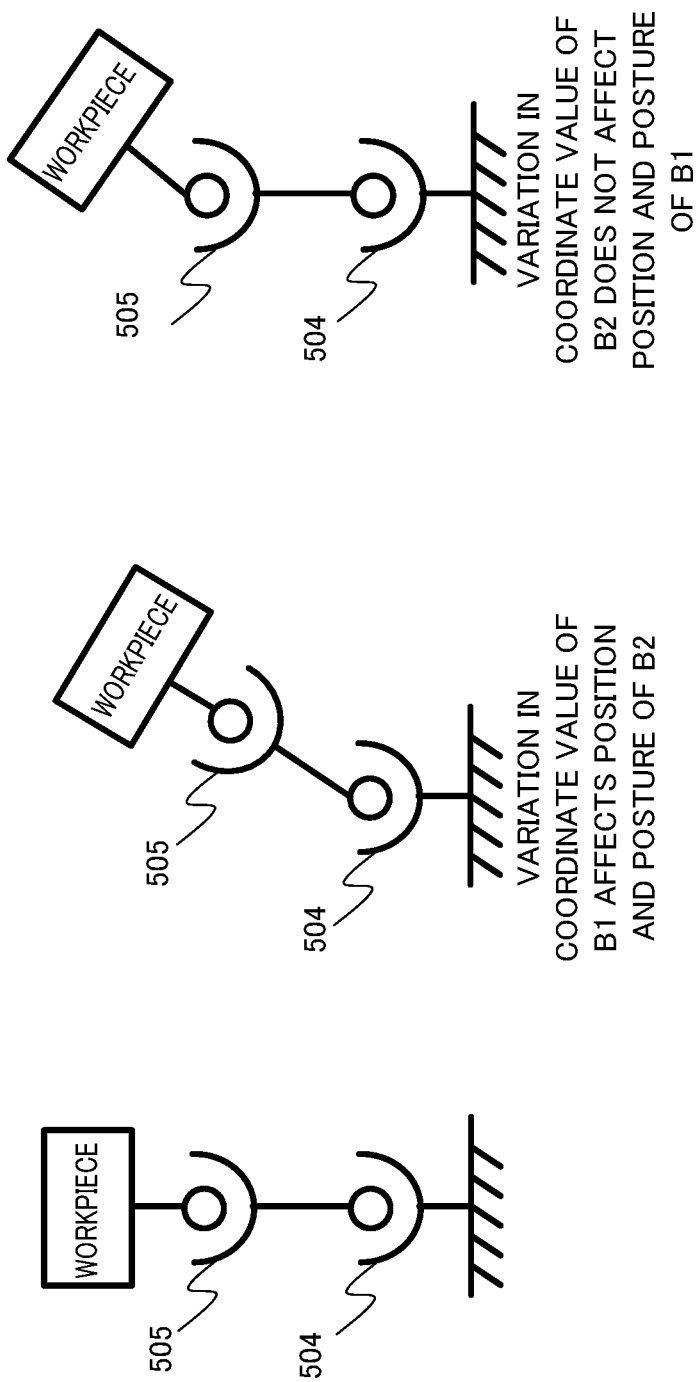

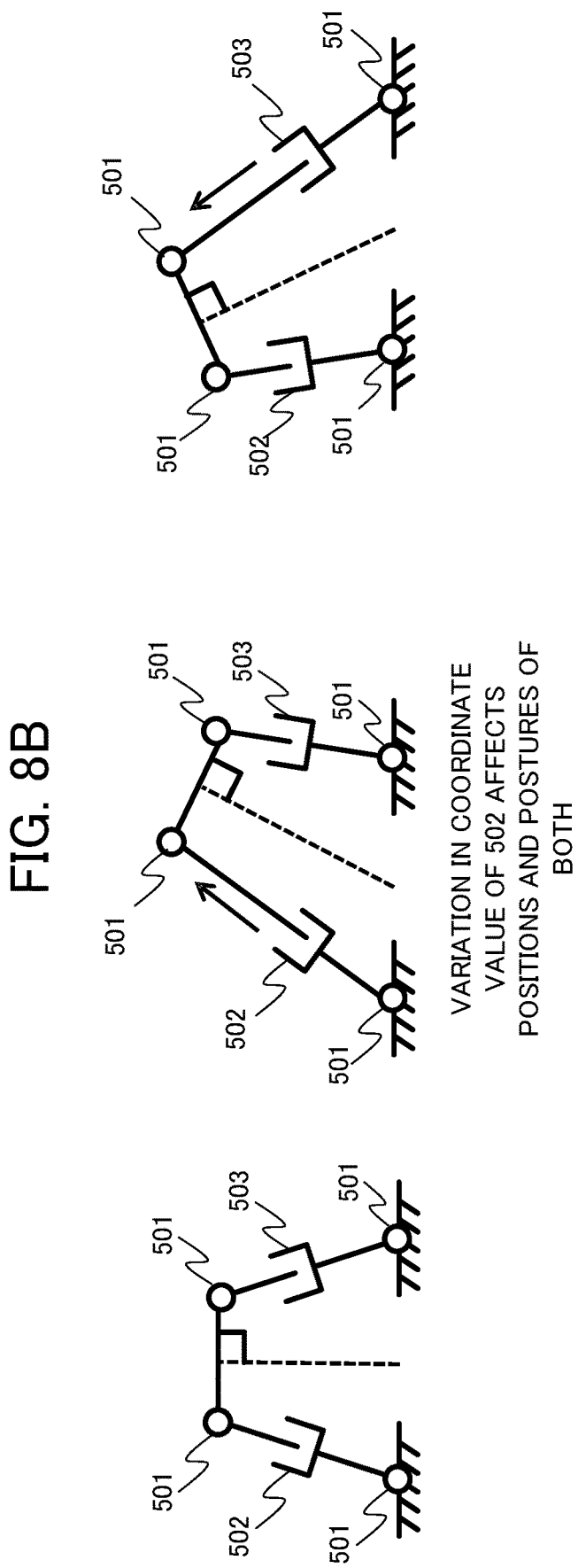

FIG. 9C
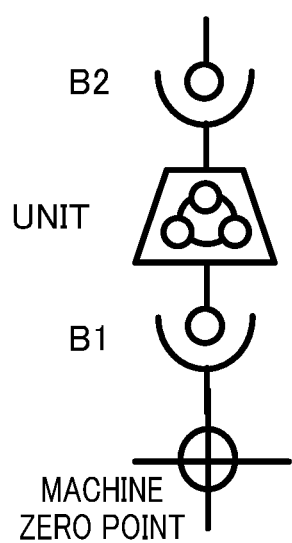
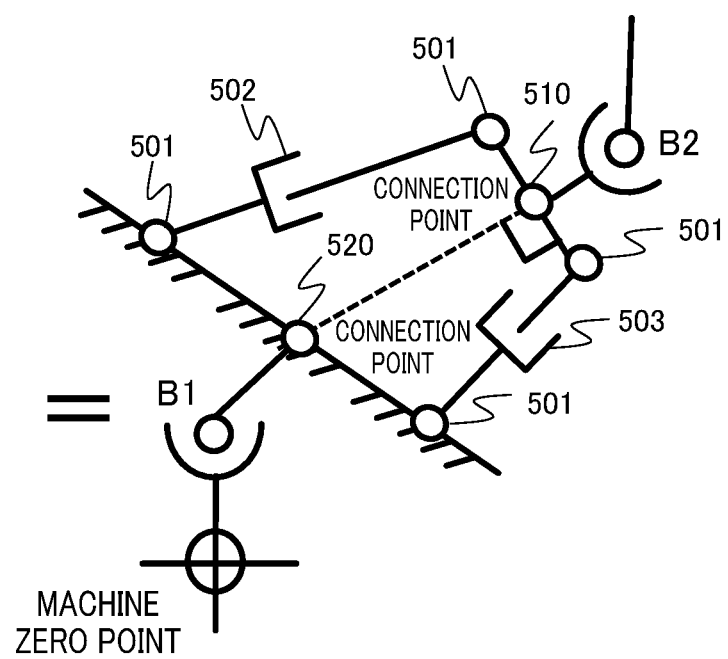

FIG. 10
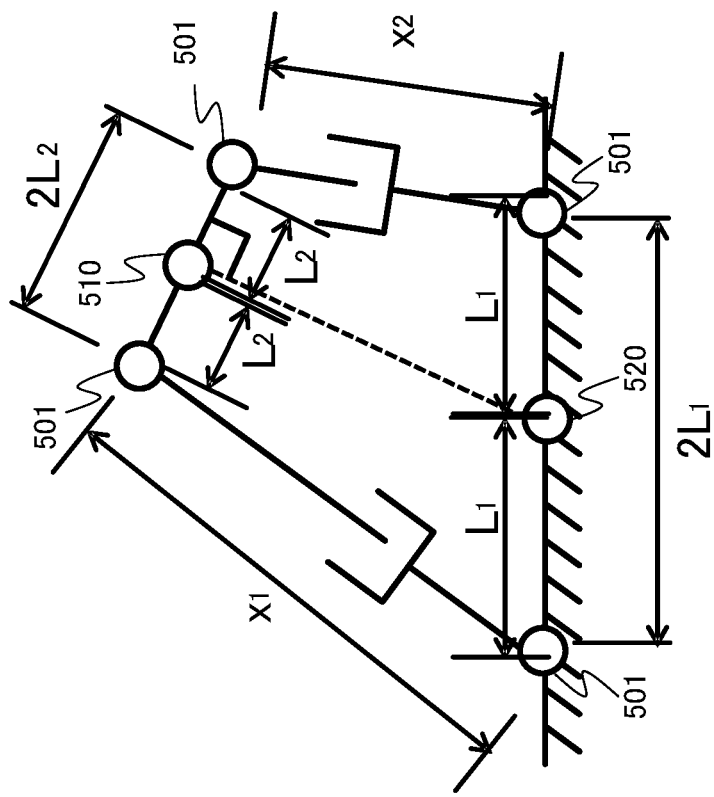
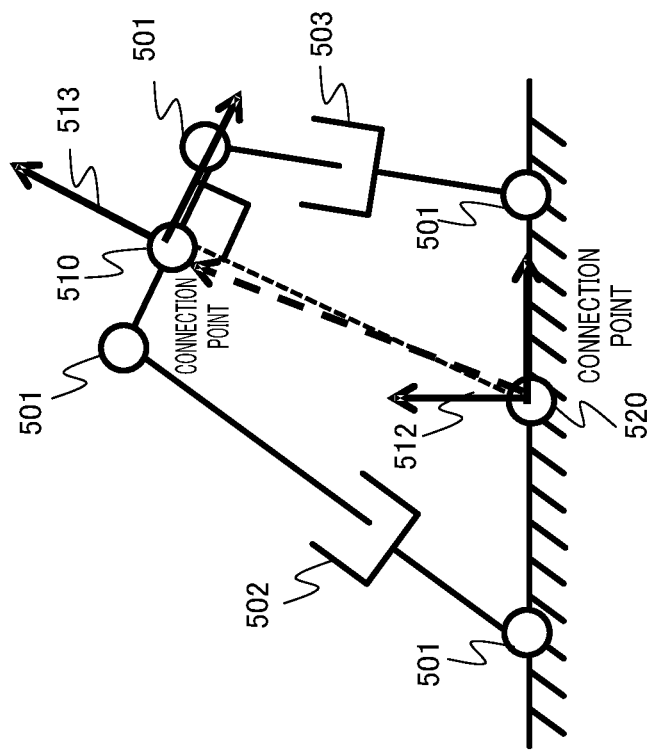
512: HOMOGENEOUS MATRIX MA REPRESENTING POSITION AND POSTURE OF CONNECTION POINT 520
513: HOMOGENEOUS MATRIX MB REPRESENTING POSITION AND POSTURE OF CONNECTION POINT 510

MACHINE CONFIGURATION

MACHINE ZERO POINT

MACHINE CONFIGURATION TREE

MACHINE CONFIGURATION

MACHINE CONFIGURATION

NUMBER OF NODES 34

NUMBER OF NODES 21

NUMBER OF NODES 12

FIG. 22C

| PATTERN | BRANCH1 | BRANCH2 | BRANCH3 |
|---|---|---|---|
| 1 | 1 | 1 | — |
| 2 | 2 | 1 | — |
| 3 | 1 | 2 | 1 |
| 4 | 2 | 2 | 1 |
| 5 | 1 | 2 | 2 |

FIG. 22D

| BRANCH1 | BRANCH2 | BRANCH3 | PATTERN |
|---|---|---|---|
| 2 | 2 | 2 | ? |

↓
Error !

CONTROL SYSTEM

This application is based on and claims the benefit of priority from Japanese Patent Application No. 2019-038725, filed on 4 Mar. 2019, the content of which is incorporated herein by reference.

BACKGROUND OF THE INVENTION

Field of the Invention

The present invention relates to a control system.

Related Art

A numerical control device in prior art is only able to control machine tools in limited machine configurations, and thus special machine configurations need to be dealt with individually. In this regard, a known technology is used for controlling machine tools by using a machine configuration tree corresponding to the configuration of the machine tools (refer to, for example, Patent Document 1).

In such a machine configuration tree, a machine configuration is represented in a tree structure with respective axes, respective workpieces, respective tools and the like as nodes, thereby enabling to flexibly set and store the machine configuration. The nodes of the machine configuration tree include various types of node information (offset, posture, axis number, axis name, etc.). As the number of nodes increases, the machine configuration data increases.

Patent Document 1: Japanese Unexamined Patent Application, Publication No. 2019-012342

SUMMARY OF THE INVENTION

A numerical control device in prior art previously has a function, called "machine configuration selection function," of previously storing a plurality of pieces of machine configuration information and performing switching to a desired machine configuration by a G code at the time of program creation. The function is to, for example, when a different configuration is attached as one unit of a plurality of axes in the vicinity of a tool or a table during machining, change parameters relating to machine configuration by a single operation.

In the field of the numerical control device configured to set a machine configuration by use of a machine configuration tree, when switching to a desired machine configuration, the numerical control device is required to change the entire machine configuration tree from one machine configuration tree to another machine configuration tree. With the increase in the number of machine configuration trees subjected to switching, the memory for common nodes, if any, is used wastefully.

FIG. 27 shows an example of machine configuration trees of a set number 1 to a set number 3. In FIG. 27, the elements of a zero point, an X axis, a Y axis, and a Z axis indicated by dotted lines are common in the machine configuration trees of the set number 1 to the set number 3. The numerical control device configured to switch the entire machine configuration tree needs to redundantly store the common portions by the number of machine configuration trees, and the corresponding memory is thus consumed wastefully.

To deal with this, in the case where a greater number of machine configuration trees are subjected to the switching performed by the numerical control device, it is desirable for wasteful memory consumption to be reduced as compared with prior art.

In one aspect of the present disclosure, a control system for an industrial machine including a machine configuration editing device and a machine configuration management device is configured to represent a machine configuration to be controlled in a graph-like machine configuration tree having constituent elements as nodes. The machine configuration editing device acquires machine configuration data for generating the machine configuration tree. The machine configuration management device includes a machine configuration tree generation portion configured to generate a plurality of the machine configuration trees on the basis of the machine configuration data, and a node information change portion configured to generate a single machine configuration tree having a branch node set at a position corresponding to a boundary between common nodes and different nodes in the plurality of machine configuration trees and having the different nodes in the plurality of machine configuration trees so as to branch from the branch node toward tips.

According to the one aspect, wasteful memory consumption is reduced as compared with prior art in the case where a greater number of machine configuration trees are subjected to switching by a numerical control device.

BRIEF DESCRIPTION OF THE DRAWINGS

FIG. 1 is a diagram showing an outline of a control system of one embodiment;

FIG. 8A is an illustrative diagram of a parent-child relationship of constituent elements of a machine in the embodiment;

FIG. 8B is an illustrative diagram of the parent-child relationship of the constituent elements of the machine in the embodiment;

FIG. 9C is an illustrative diagram of the method of inserting the unit into the machine configuration tree;

FIG. 10 is a diagram showing an example of a machine configuration according to the embodiment;

FIG. 22C is a diagram showing pattern information for use in the control system of the embodiment;

FIG. 22D is a diagram showing a matching result with pattern information for use in the control system of the embodiment;

DETAILED DESCRIPTION OF THE INVENTION

1 First Embodiment

<1. 1 Overview>

FIG. 1 shows an outline of a control system according to the first embodiment. It is assumed that a numerical control device controls, by using three machine configuration trees of a set number 1 to a set number 3 shown in the upper part of FIG. 1, machine tools corresponding to the respective machine configuration trees. It is noted that the machine configuration trees of the set number 1 to the set number 3 have the common elements of a zero point, an X axis, a Y axis, and a Z axis.

In this case, as in the description of the related art, regarding the three machine configuration trees, when a memory stores the entire machine configuration trees, the memory needs to store the three respective common elements, and the corresponding memory is thus consumed wastefully.

Therefore, as shown in the lower part of FIG. 1, a node having a common configuration in the machine configuration trees of the set number 1 to the set number 3 is first set in a new single machine configuration tree. Then, a SWITCH node (hereinafter also referred to as "branch node") is set adjacent to the boundary between the points having a common configuration and the points having a different configuration in the machine configuration trees of the set number 1 to the set number 3, in other words, being set in a tip direction adjacent to the terminal node having a common configuration as seen from the root node indicated as the "zero point" in FIG. 1. Furthermore, the nodes having a different configuration (CASE nodes) in the machine configuration trees of the set number 1 to the set number 3 are set at the tip of the SWITCH node so as to branch from the SWITCH node.

It is noted that the machine configuration tree of the set number 1 described above may be used as a "single configuration tree," and that a single machine configuration tree including the SWITCH node may be generated by editing the machine configuration tree of the set number 1.

Such setting enables to represent a plurality of machine configuration trees not including any SWITCH node in a single machine configuration tree including a SWITCH node. The numerical control device controls, by using the single machine configuration tree including a SWITCH node, a plurality of machine tools of different types.

<1. 2 Configuration>

Figure 2:
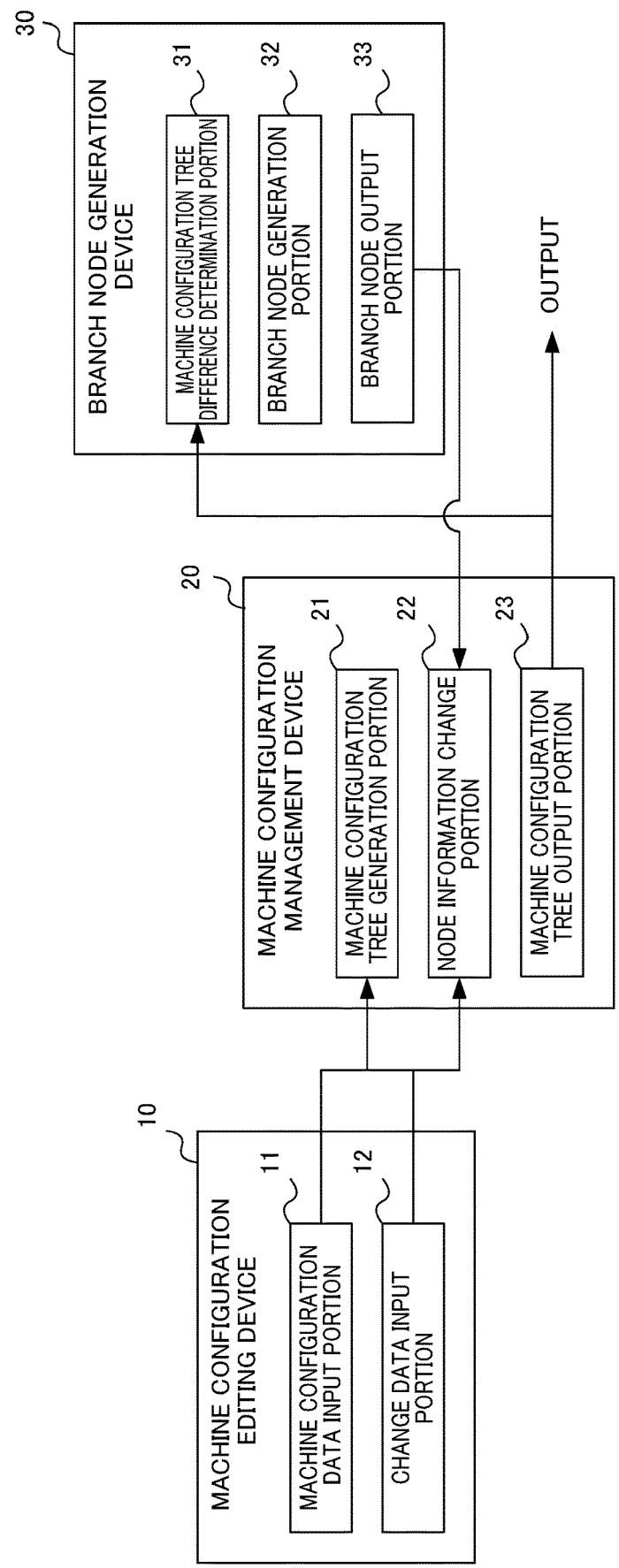
FIG. 2 is an overall configuration diagram of the control system of the embodiment.

FIG. 2 shows the overall configuration of a control system 1 according to the present embodiment. The control system 1 includes a machine configuration editing device 10, a machine configuration management device 20, and a branch node generation device 30.

The machine configuration editing device 10 is configured to input the data required when the machine configuration management device 20 generates a machine configuration tree. The machine configuration editing device 10 includes a control unit (not shown). The control unit, which is configured to control the entire machine configuration editing device 10, reads out and executes various types of programs as needed from a storage area such as ROM, RAM, flash memory, or hard disk (HDD), to realize various functions in the present embodiment. The control unit may be a CPU. The control unit includes a machine configuration data input portion 11 and a change data input portion 12.

The machine configuration data input portion 11 inputs the data to be required when the machine configuration management device 20 generates a machine configuration tree. Specifically, when the machine configuration management device 20 generates a machine configuration tree having a branch node, the machine configuration data input portion 11 inputs the data (hereinafter also referred to as "machine configuration data") required to generate at least one machine configuration tree of any set number in a plurality of machine configuration trees not having any branch node serving as the basis of the machine configuration tree. The data may include, for example, data related to at least any one attribution value in individual axes, individual workpieces, and individual tools included in the machine tool corresponding to the machine configuration tree.

The change data input portion 12 inputs data related to a machine configuration tree different from the machine configuration tree corresponding to the data input by the machine configuration data input portion 11. Specifically, the change data input portion 12 inputs, on the basis of the data input by the machine configuration data input portion 11, data (hereinafter also referred to as "change data") different from the base data in the data related to the different machine configuration tree. Alternatively, the change data input portion 12 may mirror a portion of the data included in the base data or may modify a portion of the base data to input data related to the different machine configuration tree.

The machine configuration management device 20 is configured mainly to generate and store a machine configuration tree, write to a machine configuration tree, and output a machine configuration tree. The machine configuration management device 20 includes a control unit (not shown), as with the machine configuration editing device 10. The control unit, which is configured to control the entire machine configuration management device 20, reads out and executes various types of programs as needed from a storage area such as ROM, RAM, flash memory, or hard disk (HDD), to realize various functions in the present embodiment. The control unit may be a CPU. The control unit includes a machine configuration tree generation portion 21, a node information change portion 22, and a machine configuration tree output portion 23.

The machine configuration tree generation portion 21 generates a machine configuration tree on the basis of the machine configuration data input by the machine configuration editing device 10 (machine configuration data input portion 11). The machine configuration tree may be a machine configuration tree not including any branch node or may be a machine configuration tree including branch nodes. It is noted that the method of generating a machine configuration tree will be detailed in the following sections of <1.3 Method of generating machine configuration tree> and <1.4 Automatic insertion of control point and coordinate system>.

The node information change portion 22 changes the node information included in the machine configuration tree on the basis of the change data. Thus, in the machine configuration management device 20, the machine configuration tree including branch nodes is generated. More specifically, the node information change portion 22 generates a machine configuration tree having a branch node set at a position corresponding to the boundary between common nodes and different nodes in the plurality of machine configuration trees serving as the basis. Furthermore, the node information change portion 22 sets nodes that are different in the plurality of machine configuration trees serving as the basis so that a new machine configuration tree has the different nodes branching from the branch node toward the tips. This allows the new machine configuration tree to represent a plurality of machine configuration trees serving as the basis in an aggregated state.

Specifically, in the present embodiment, as will be described later, the node information change portion 22 sets the branch node input by the branch node generation device 30 (branch node output portion 33) as the branch node described above.

The machine configuration tree output portion 23 outputs the machine configuration tree(s) to the outside of the machine configuration management device 20. Specifically, the machine configuration tree output portion 23 may output the machine configuration trees not including any branch node to the branch node generation device 30 and/or a numerical control device (not shown) or may output the machine configuration tree including the branch node to the corresponding numerical control device.

The branch node generation device 30 is configured mainly to search a plurality of machine configuration trees for a point for branching to generate a branch node. The branch node generation device 30 includes a control unit (not shown), as with the machine configuration editing device 10. The control unit, which is configured to control the entire branch node generation device 30, reads out and executes various programs as needed from a storage area such as ROM, RAM, flash memory, or hard disk (HDD), to realize various functions in the present embodiment. The control unit may be a CPU. The control unit includes a machine configuration tree difference determination portion 31, a branch node generation portion 32, and a branch node output portion 33.

The machine configuration tree difference determination portion 31 simultaneously search a plurality of machine configuration trees for nodes from the root nodes to determine nodes that are different in the plurality of machine configuration trees (hereinafter also referred to as "depth priority search").

The branch node generation portion 32 generates the branch node to be set at the boundary between common nodes and different nodes in the plurality of machine configuration trees.

Figure 3:
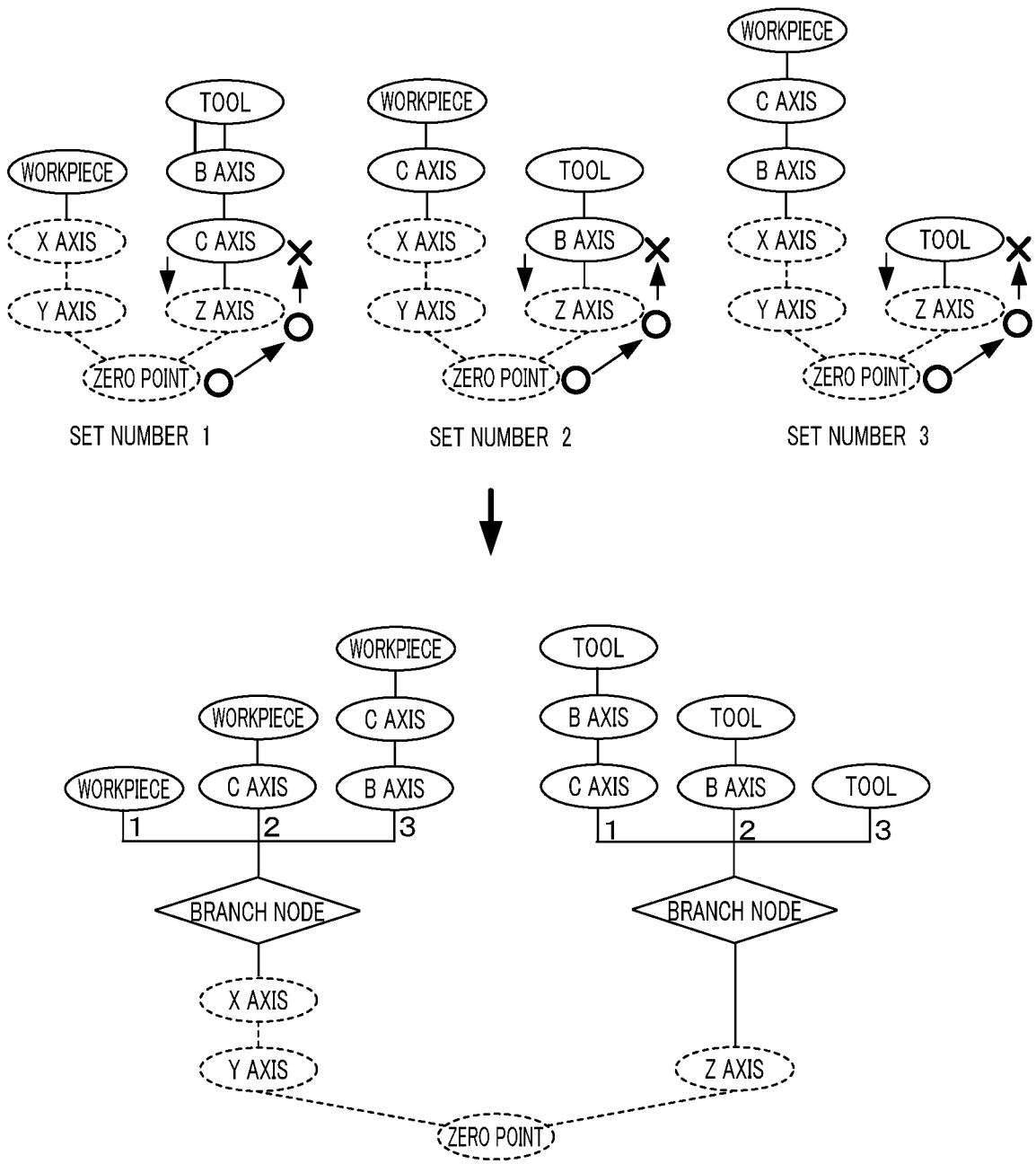
FIG. 3 is a diagram showing an outline of an operation of the control system of the embodiment.

FIG. 3 shows an outline of an operation example of the machine configuration tree difference determination portion 31 and the branch node generation portion 32. As shown in the upper part of FIG. 3, the machine configuration tree difference determination portion 31 concurrently searches the machine configuration trees of the set number 1 to the set number 3 for different nodes from the root nodes toward the tips of the respective machine configuration trees. In this case, although the root node (zero point) and the Z axis are common nodes in the machine configuration trees of the set number 1 to the set number 3, the succeeding node in the machine configuration tree of the set number 1 is a C axis; the succeeding node in the machine configuration tree of the set number 2 is a B axis; and the succeeding node in the machine configuration tree of the set number 3 is a tool. Therefore, the machine configuration tree difference determination portion 31 determines the nodes that are different in the machine configuration trees as CASE nodes and returns to the root nodes, and thereafter starts searching in the direction of the Y axis in the respective machine configuration trees.

As a result, the branch node generation portion 32 generates, as shown in the lower part of FIG. 3, the branch nodes to be set between the X axis corresponding to the common node in the machine configuration trees of the set number 1 to the set number 3 and the different nodes located in the tip directions thereof (workpiece, C axis+ workpiece, B axis+C axis+ workpiece), and between the Z axis corresponding to the common node and the different nodes located in the tip directions thereof (C axis+B axis+ workpiece, B axis+ tool, tool).

The branch node output portion 33 outputs the branch nodes to the outside of the branch node generation device 30. Specifically, in the example in FIG. 2, the branch node output portion 33 outputs the branch nodes to the machine configuration management device 20 (node information change portion 22).

<1.3 Method of Generating Machine Configuration Tree>

The applicant has filed, for example, in Patent Application No. 2017-233786, the invention related to a control device configured to control a machine tool by use of a machine configuration tree. Moreover, the applicant has filed, for example, in Patent Application No. 2017-127692, the invention related to a virtual object display system by use of a machine configuration tree. The outline of the method of generating a machine configuration tree, redundantly including some portion of the specifications according to these applications, will be described below.

The machine configuration management device 20 according to the embodiment of the present invention first generates the graph representing the machine configuration. A method of generating a machine configuration tree as an example of the graph will be described in detail with reference to FIGS. 4 to 10.

Figure 4:
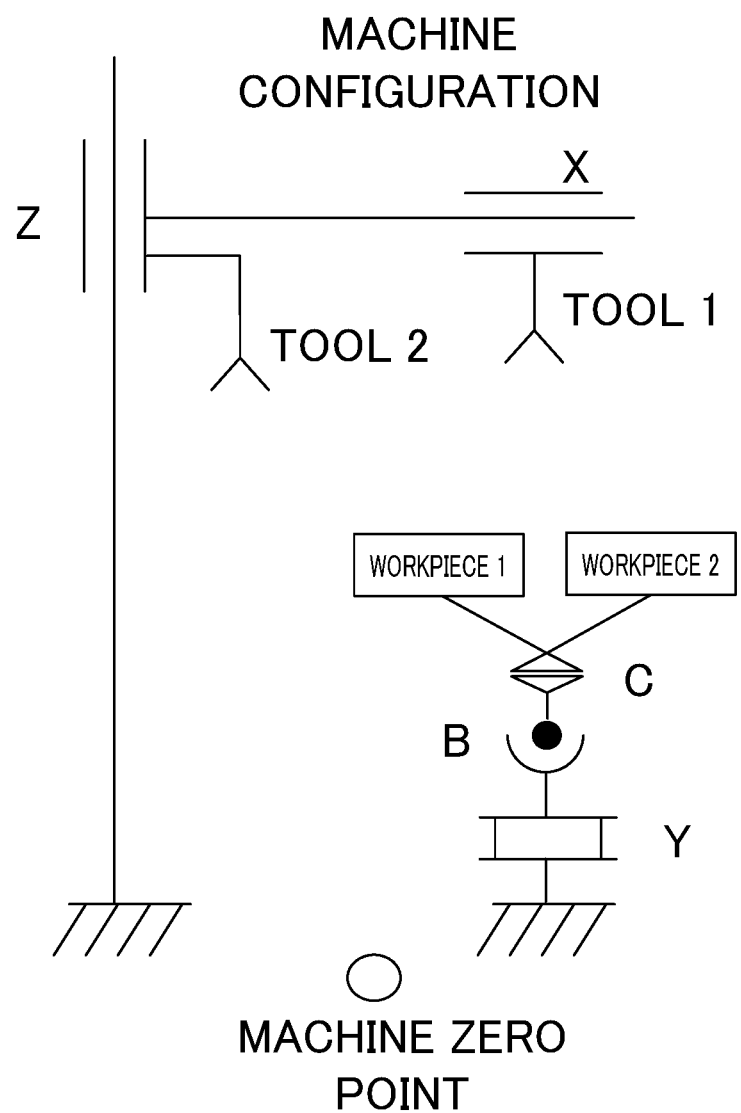
FIG. 4 is an illustrative diagram of a method of generating a machine configuration tree in the embodiment.

As the example, the method of generating the machine configuration tree representing the configuration of a machine shown in FIG. 4 will be described. In the machine of FIG. 4, it is assumed that an X axis is set perpendicular to a Z axis, that a tool 1 is installed in the X axis, and that a tool 2 is installed in the Z axis. On the other hand, it is assumed that a B axis is set on a Y axis, that a C axis is set on the B axis, and that a workpiece 1 and a workpiece 2 are installed in the C axis. The method of representing the machine configuration as the machine configuration tree will be described below.

Figure 5:
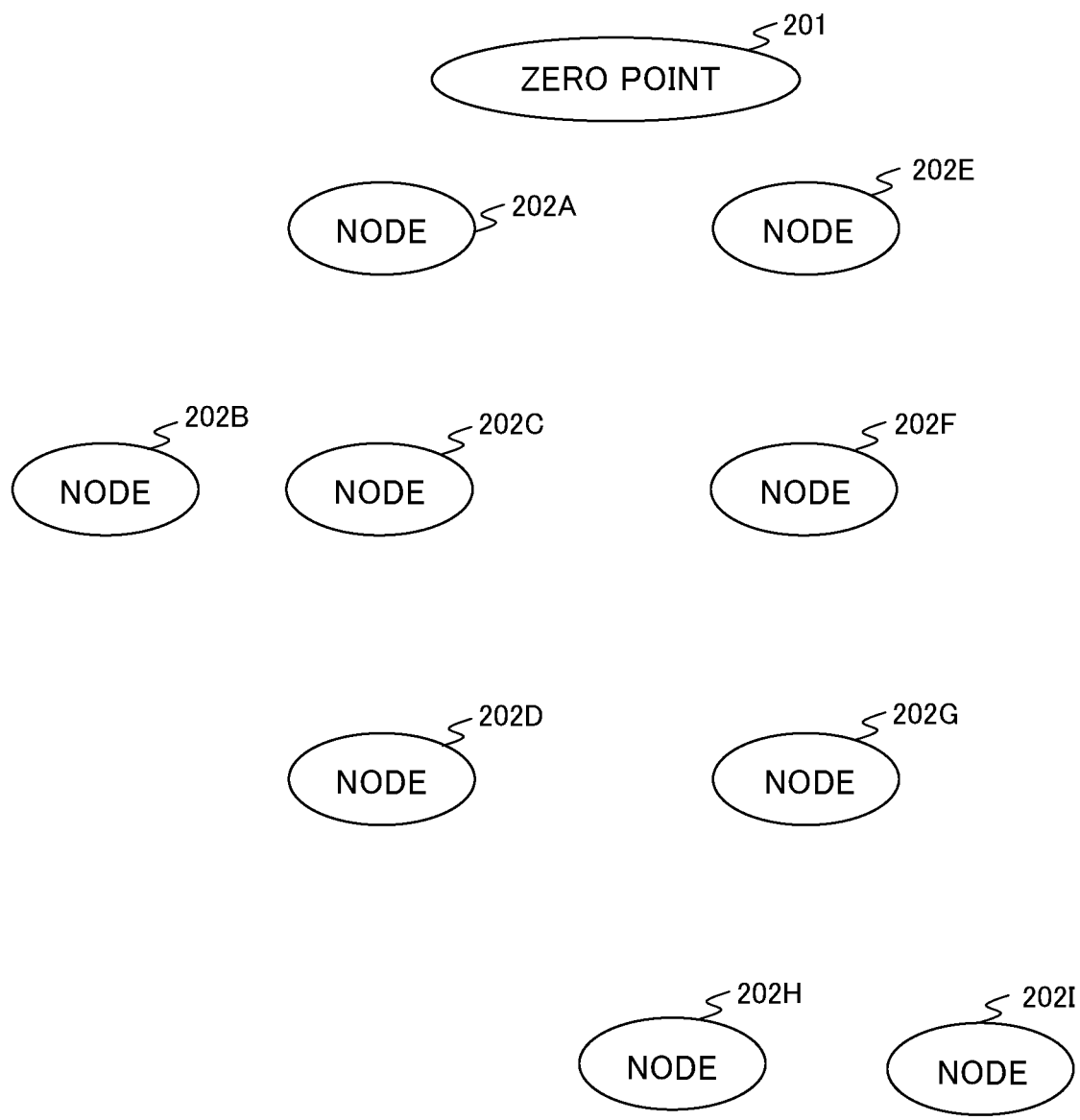
FIG. 5 is an illustrative diagram of the method of generating the machine configuration tree in the embodiment.

First, as shown in FIG. 5, only a zero point 201 and nodes 202A to 202I are arranged. In this stage, there is no connection between the zero point 201 and the nodes 202 and between the nodes 202, and the names of the zero point and the nodes are not set.

Figure 6:
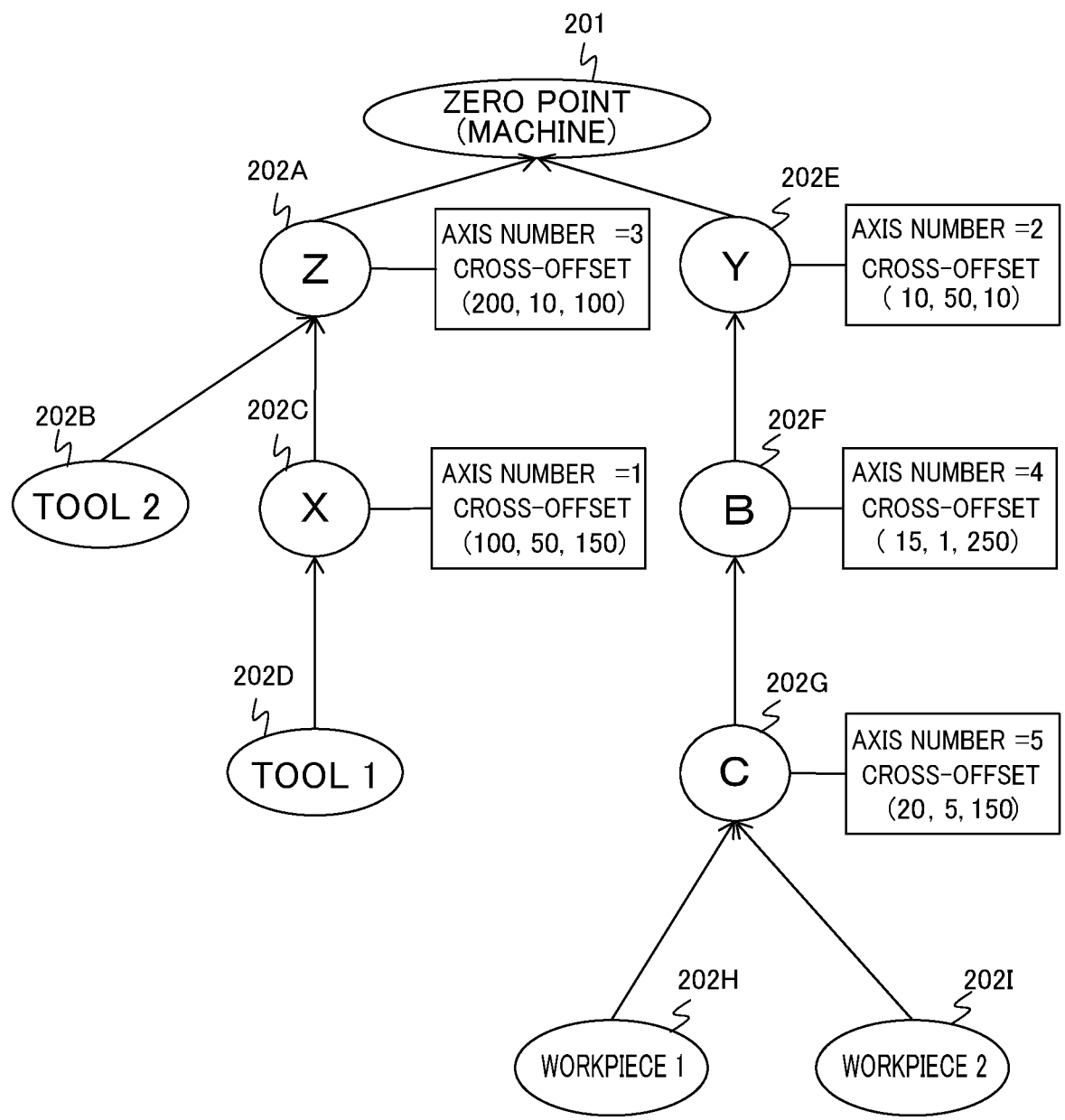
FIG. 6 is an illustrative diagram of the method of generating the machine configuration tree in the embodiment.

Then, the axis names (axis types) of the individual axes, the names of the individual tools, the names of the individual workpieces, the names of the individual zero points, and the physical axis numbers (axis types) of the individual axes are set. Then, the parent nodes (axis types) of the individual axes, the parent nodes of the individual tools, and the parent nodes of the individual workpieces are set. Finally, the cross-offsets (axis types) of the individual axes, the cross-offsets of the individual tools, and the cross-offsets of the individual workpieces are set. Consequently, the machine configuration tree shown in FIG. 6 is generated.

Each node of the machine configuration tree is not limited to the pieces of information described above, and it may or may not have information related to, for example, an identifier (name), the identifier of the parent node of itself, the identifiers of all child nodes whose parents are itself, a relative offset (cross-offset) with respect to the parent node, a relative coordinate value with respect to the parent node, a relative movement direction (unit vector) with respect to the parent node, node types (linear axis/rotary axis/unit (which will be described later)/control point/coordinate system/zero point and the like), the physical axis number, and the transformation formulas of an orthogonal coordinate system and a physical coordinate system.

As described above, values are set to the individual nodes, and thus data which has a data structure in the shape of a machine configuration tree is generated within the machine configuration management device 20. Furthermore, even when another machine (or robot) is added, a zero point is added, and thus it is possible to further add nodes.

Figure 7:
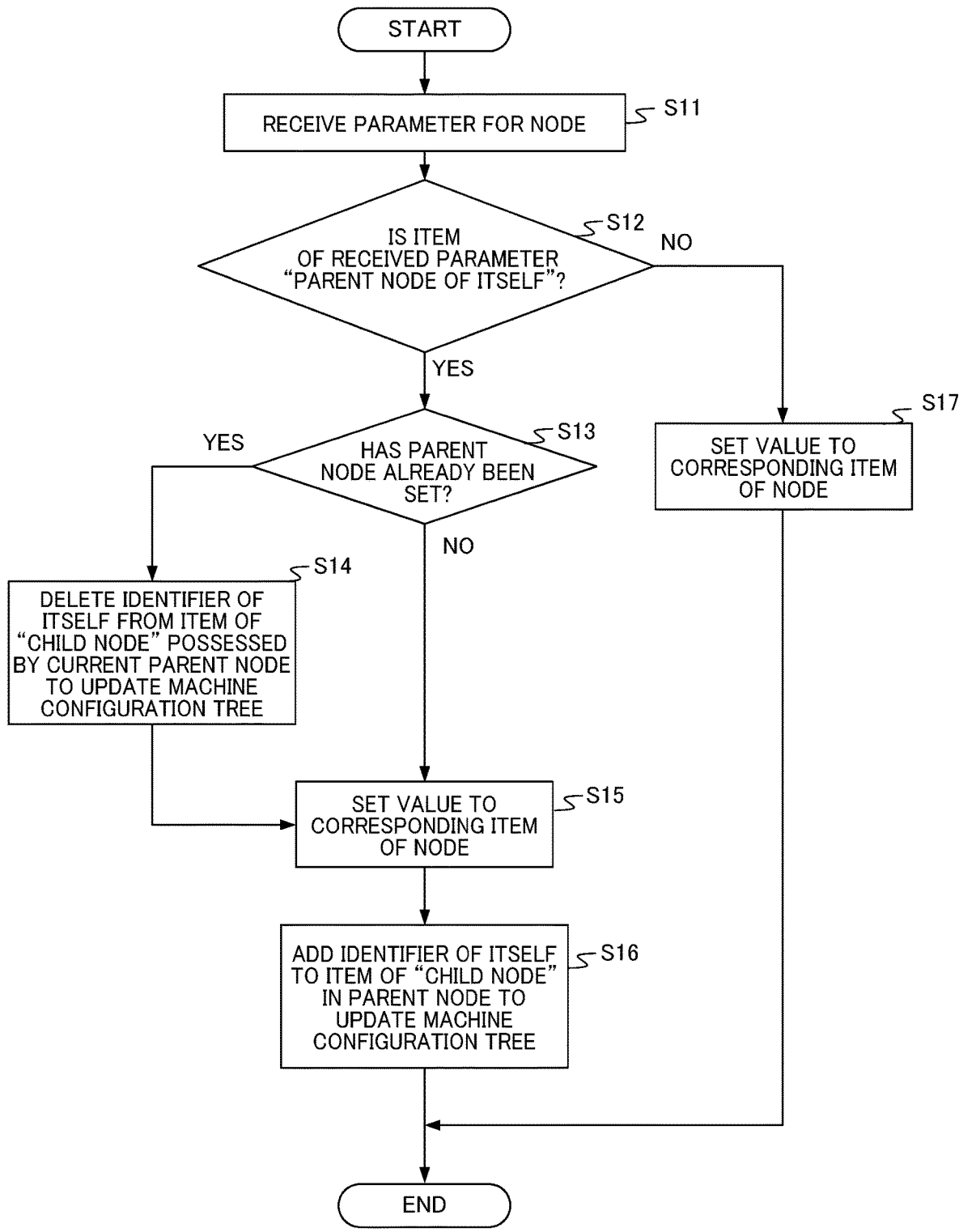
FIG. 7 is a flowchart showing the method of generating the machine configuration tree in the embodiment.

A flowchart obtained by generalizing the method of generating the machine configuration tree described above, in particular, the method of setting the values to the individual nodes is shown in FIG. 7.

In step S11, the machine configuration tree generation portion 21 receives the value of a parameter set to the node. When in step S12, the item of the set parameter is "parent node of itself" (yes in S12), the processing is transferred to step S13. When the item of the set parameter is not "parent node of itself" (no in S12), the processing is transferred to step S17.

When in step S13, a parent node has already been set to the node to which the parameter is set (yes in S13), the processing is transferred to step S14. When a parent node has not been set (no in S13), the processing is transferred to step S15.

In step S14, the machine configuration tree generation portion 21 deletes the identifier of itself from the item of "child node" possessed by the current parent node of the node to which the parameter is set so as to update the machine configuration tree.

In step S15, the machine configuration tree generation portion 21 sets the value to the corresponding item of the node to which the parameter is set.

In step S16, the machine configuration tree generation portion 21 adds the identifier of itself to the item of "child node" in the parent node so as to update the machine configuration tree, and thereafter the flow is completed.

In step S17, the machine configuration tree generation portion 21 sets the value to the corresponding item of the node to which the parameter is set, and thereafter the flow is completed.

The method of generating the data having the data structure in the shape of the machine configuration tree described above is used, and thus it is possible to set a parent-child relationship of the constituent elements of the machine. Here, the parent-child relationship refers to a relationship in which, for example, when as illustrated in FIG. 8A, two rotary axis nodes 504 and 505 are present, a variation in the coordinate value of the node 504 on one side unilaterally affects the geometric state (typically, the position and the posture) of the node 505 on the other side. In this case, the nodes 504 and 505 are said to have a parent-child relationship, the node 504 is referred to as a parent, and the node 505 is referred to as a child. However, for example, as shown in FIG. 8B, in a machine configuration that is configured with two linear axis nodes 502 and 503 and four free joints 501, a mechanism is present in which as the coordinate value (length) of one of the nodes 502 and 503 is varied, not only the geometric state of the other node but also the geometric state of itself is varied, that is, the nodes affect each other. In such a case, both of them are parents and children, and in other words, the parent-child relationship can be regarded as being bidirectional.

Figure 9A:
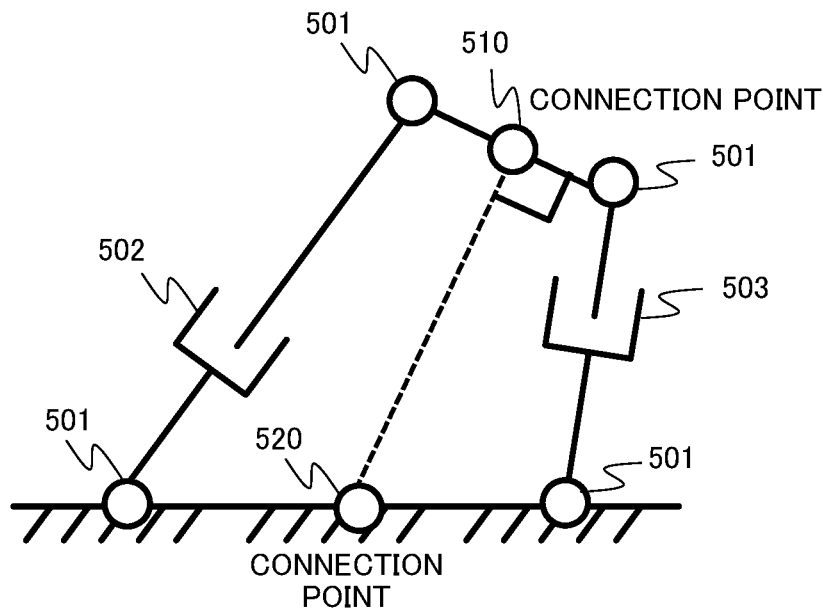
FIG. 9A is an illustrative diagram of a method of inserting a unit into the machine configuration tree.
Figure 9B:
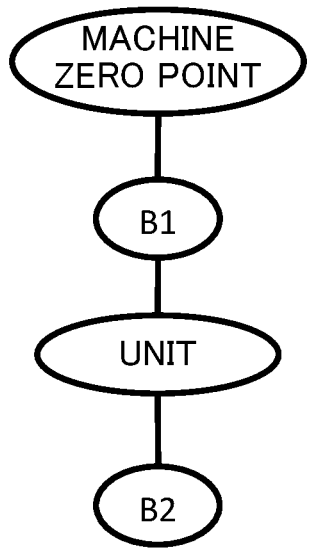
FIG. 9B is an illustrative diagram of the method of inserting the unit into the machine configuration tree.

As described above, a mechanism in which a variation in a certain node affects the other node is regarded as one unit in terms of convenience, this unit is inserted into the machine configuration tree, and thus the entire machine configuration tree is generated. As shown in FIG. 9A, the unit has two connection points 510 and 520, and when the unit is inserted into the machine configuration tree as shown in FIG. 9B, as shown in FIG. 9C, the parent node is connected to the connection point 520, and the child node is connected to the connection point 510. The unit also has a transformation matrix from the connection point 520 to the connection point 510. This transformation matrix is indicated by the coordinate values of the individual nodes included in the unit. For example, in the case of a machine configuration as shown in FIG. 10, when a homogeneous matrix indicating the position and the posture of the connection point 520 is assumed to be $M_A$, and a homogeneous matrix indicating the position and the posture of the connection point 510 is assumed to be $M_B$, a transformation formula between the matrices is represented as follows by use of the coordinate values $x_1$ and $x_2$ of the linear axis nodes included in the unit.

When it is assumed that [Math. 1]

$$\theta = \sin^{-1}\left(\frac{x_1^2 - x_2^2}{4L_1 L_2}\right)$$

$$L = L_1 \cos\theta + \sqrt{0.5x_1^2 + 0.5x_2^2 - L_2^2 - L_1^2 \sin^2\theta}$$

it is represented by $$M_B = TM_A$$

where $$T = \begin{pmatrix} \sin\theta & 0 & \cos\theta & L\cos\theta \\ 0 & 1 & 0 & 0 \\ -\cos\theta & 0 & \sin\theta & L\sin\theta \\ 0 & 0 & 0 & 1 \end{pmatrix}$$

The unit indicating this machine configuration has a homogeneous transformation matrix such as T in the mathematical formula of [Math. 1] described above. The homogeneous matrix refers to a 4×4 matrix which can collectively represent the position and the posture as in the mathematical formula of [Math. 2] below.

$$\begin{pmatrix} \overset{\text{Posture}}{\begin{pmatrix} \cos\theta & -\sin\theta & 0 \\ \sin\theta & \cos\theta & 0 \\ 0 & 0 & 1 \end{pmatrix}} & \overset{\text{Position}}{\begin{pmatrix} x \\ y \\ z \end{pmatrix}} \\ 0 \quad 0 \quad 0 & 1 \end{pmatrix}$$ [Math. 2]

Even when the parent-child relationship is not mutual, in order for calculation processing or a setting to be simplified, a unit in which a plurality of nodes are previously integrated into one may be defined and configured into the machine configuration tree.

As described above, in the present embodiment, the graph of the machine configuration can include, as a constituent element, a unit in which a plurality of axes are integrated into one.

<1.4 Automatic Insertion of Control Point and Coordinate System>

In order to specify, as the control points, various positions on the machine configuration and set coordinate systems in various places on the machine configuration, the following method is performed by use of the machine configuration tree generated in <1.3 Method of generating machine configuration tree> described above.

Figure 11A:
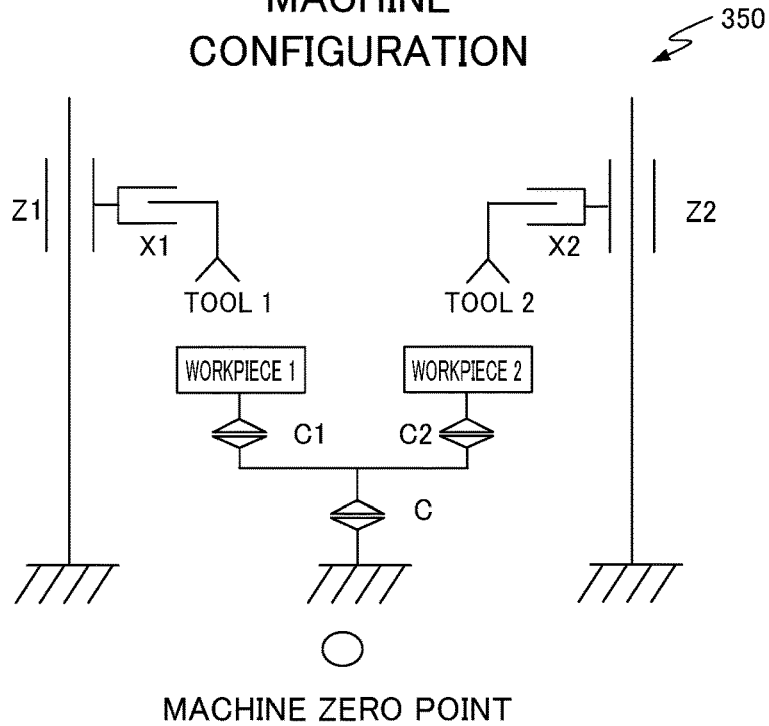
FIG. 11A is a diagram showing an example of the machine which is a target for the generation of the machine configuration tree.
Figure 11B:
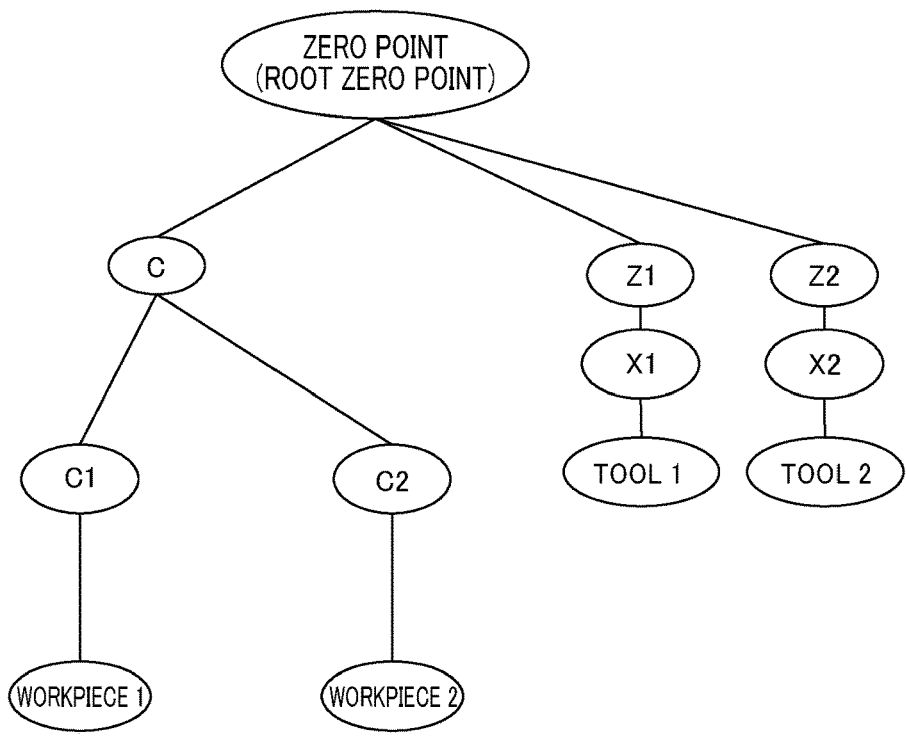
FIG. 11B is a diagram showing an example of a machine configuration tree corresponding to the machine which is the target for the generation of the machine configuration tree.

For example, in a rotary index machine 350 shown in FIG. 11A, an X1 axis is set perpendicular to a Z1 axis, and a tool 1 is installed in the X1 axis. An X2 axis is set perpendicular to a Z2 axis, and a tool 2 is installed on the X2 axis. Furthermore, it is assumed that in a table, on a C axis, a C1 axis and a C2 axis are set in parallel, and in the C1 axis and the C2 axis, a workpiece 1 and a workpiece 2 are respectively installed. When this machine configuration is represented by a machine configuration tree, the machine configuration tree shown in FIG. 11B is provided.

Figure 12:
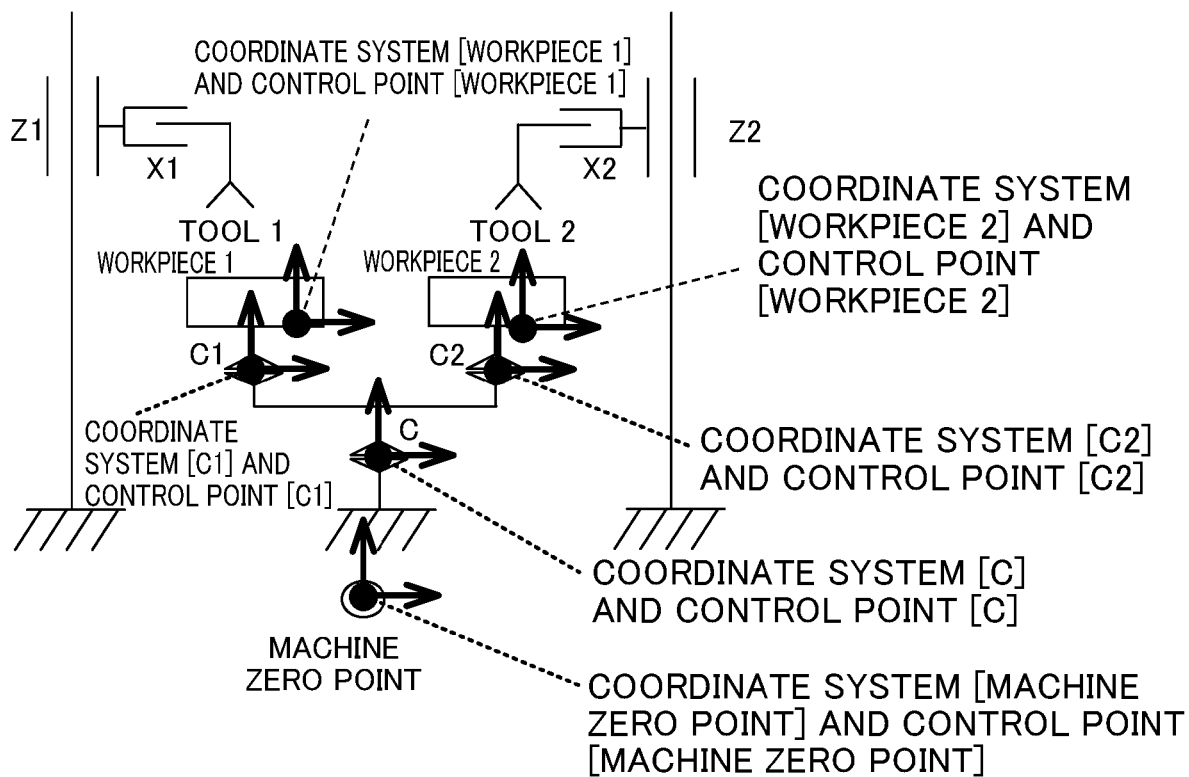
FIG. 12 is a diagram showing an example where a coordinate system and a control point are inserted into each node in the machine in the embodiment
Figure 13:
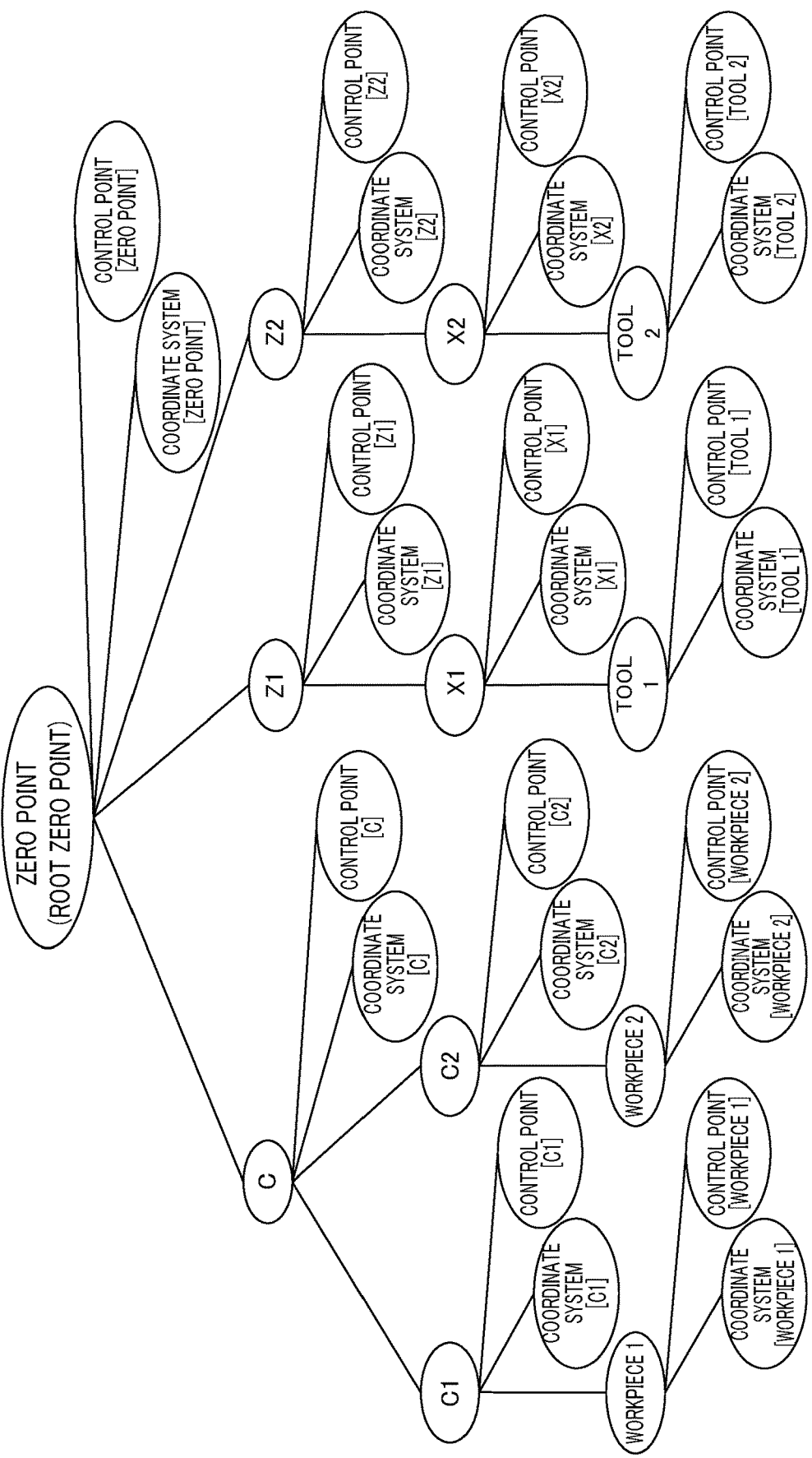
FIG. 13 is a diagram showing an example of the machine configuration tree into which the coordinate systems and the control points are inserted in the embodiment.

In an example of a series of nodes leading from individual workpieces to the machine zero point, as shown in FIG. 12, a coordinate system and a control point are automatically inserted into each of the machine zero point, the C axis, the C1 axis, the C2 axis, the workpiece 1, and the workpiece 2. This is performed not only on the table but also on the series of nodes leading from individual tools to the machine zero point, that is, all the X1 axis, the X2 axis, the Z1 axis, the Z2 axis, the tool 1, and the tool 2. Consequently, as shown in FIG. 13, into all the nodes of the machine configuration tree, the control points and the coordinate systems corresponding to the individual nodes are automatically inserted. Normally, when machining is performed, the coordinate system is specified in the workpiece, and the tool is specified as the control point. In this way, for example, it is possible to cope with various cases such as a case where in order to move a workpiece itself to a predetermined position, the control point is desired to be specified in the workpiece and a case where in order to use a certain tool to polish another tool, the coordinate system is desired to be set in the tool itself.

Figure 14A:
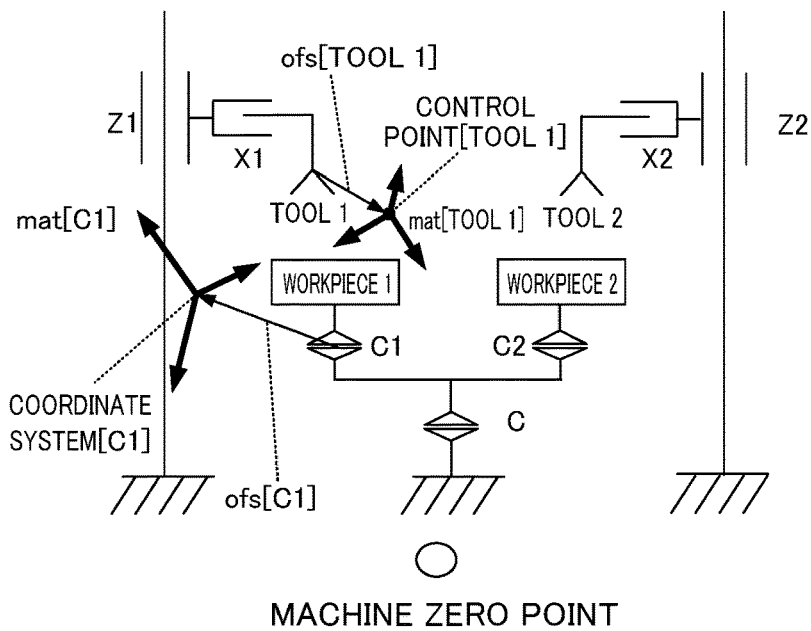
FIG. 14A is a diagram showing an example of the machine in which an offset and a posture matrix are inserted into each node in the embodiment.
Figure 14B:
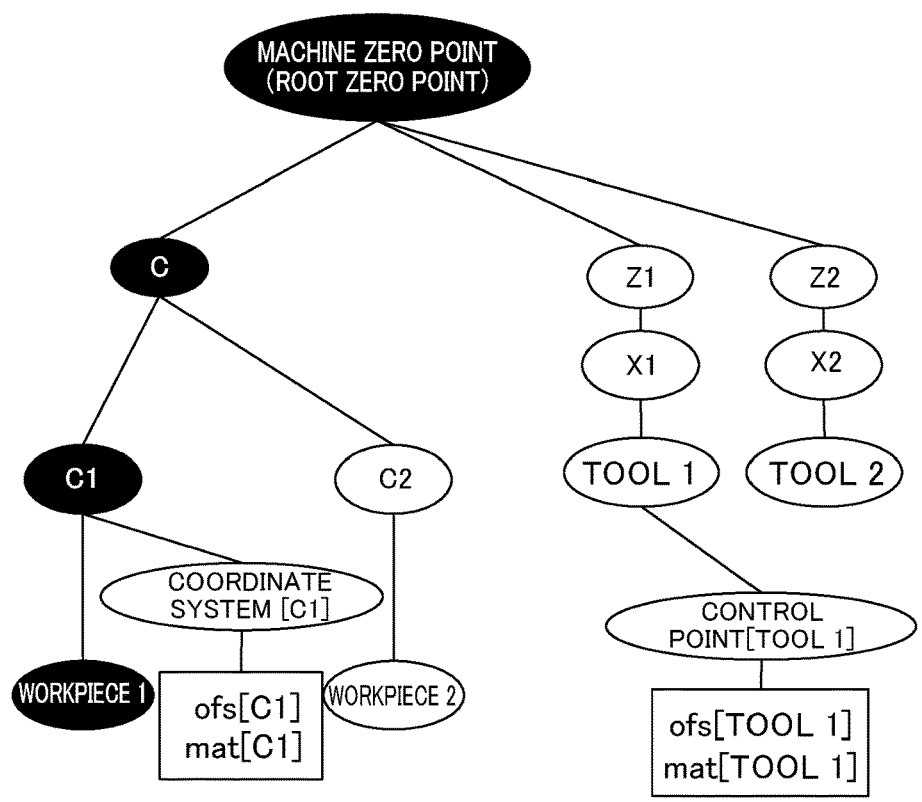
FIG. 14B is a diagram showing an example where the offset and the posture matrix are inserted into each node in the machine in the embodiment.

As shown in FIG. 14A, each of the control points and the coordinate systems has an offset. Hence, a point away from the center of the node can be set to a control point or a coordinate system zero point. Furthermore, each of the control points and the coordinate systems has a posture matrix. When this posture matrix is the posture matrix of the control point, it indicates the posture (the direction, the inclination) of the control point whereas when this posture matrix is the posture matrix of the coordinate system, it indicates the posture of the coordinate system. In a machine configuration tree shown in FIG. 14B, the offset and the posture matrix are represented so as to be associated with the nodes corresponding thereto. Furthermore, each of the control points and the coordinate systems has information on whether or not the "move" and the "cross-offset" of the node present on a path up to the root of the machine configuration tree are individually added, and the information can be set.

Figure 15:
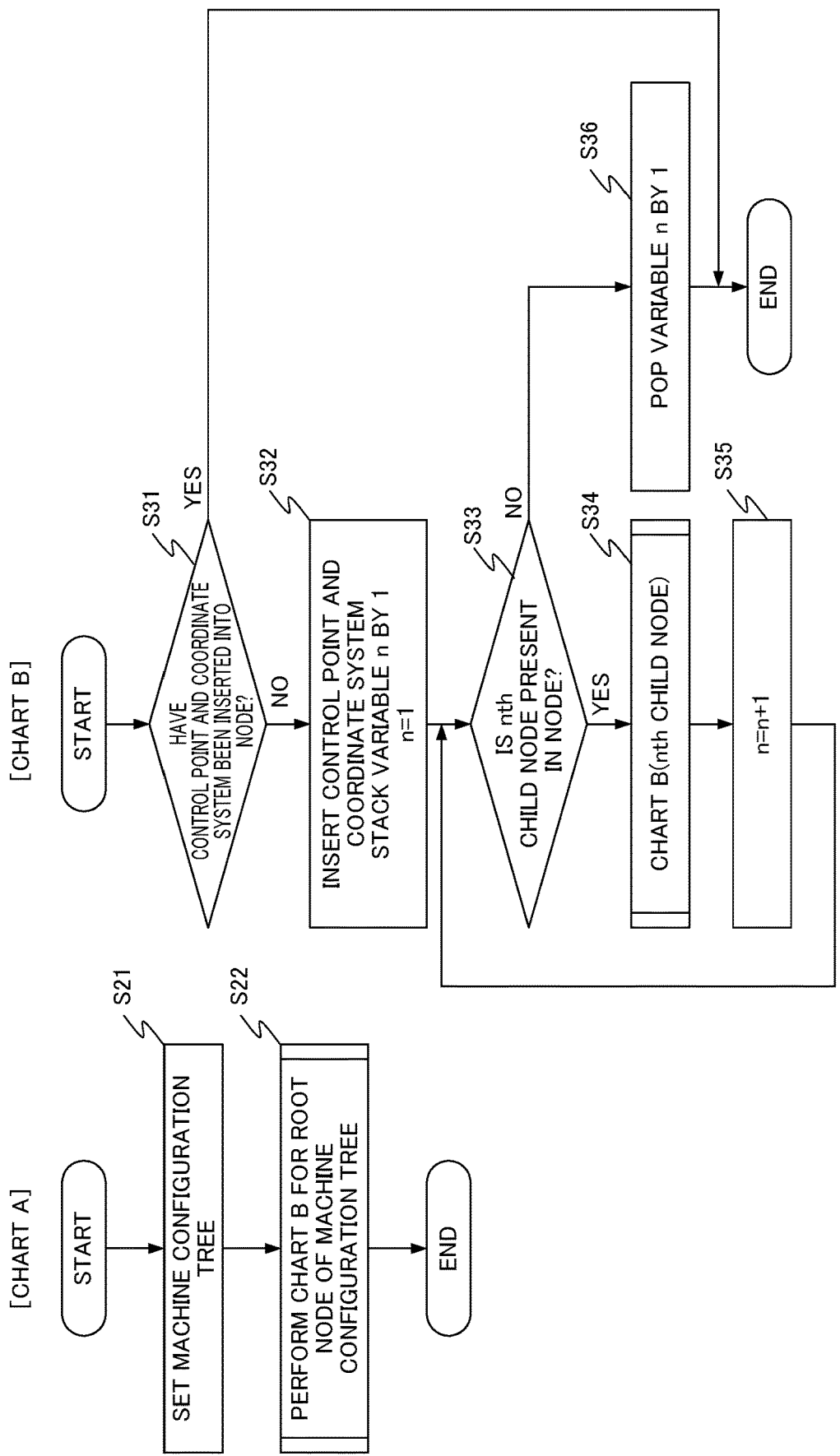
FIG. 15 is a diagram showing an operation flow of inserting the control points into the machine configuration tree in the embodiment.

A flowchart obtained by generalizing the method of automatically inserting the control point described above is shown in FIG. 15. Specifically, this flowchart includes a chart A and a chart B, and as will be described later, the chart B is performed in the middle of the chart A.

The chart A will first be described. In step S21, the machine configuration tree generation portion 21 sets a machine configuration tree. In step S22, the chart B is performed, and the flow of the chart A is completed.

The chart B will then be described. In step S31 of the chart B, when the control point and the coordinate system have been inserted into the node (yes in S31), the flow is completed. When the control point and the coordinate system have not been inserted into the node (no in S31), the processing is transferred to step S32.

In step S32, the machine configuration tree generation portion 21 inserts the control point and the coordinate system into the node and stacks a variable n by 1. A setting is made such that n=1.

In step S33, when the $n^{th}$ child node is present in the node (yes in S33), the processing is transferred to step S34. When the $n^{th}$ child node is not present in the node (no in S33), the processing is transferred to step S36.

In step S34, on the $n^{th}$ child node, the chart B itself is performed in a recursive manner.

In step S35, n is incremented by 1. In other words, the increment is performed such that n=n+1, and the processing is returned to step S33.

In step S36, the variable n is popped by 1, and the flow of the chart B is completed.

Figure 16:
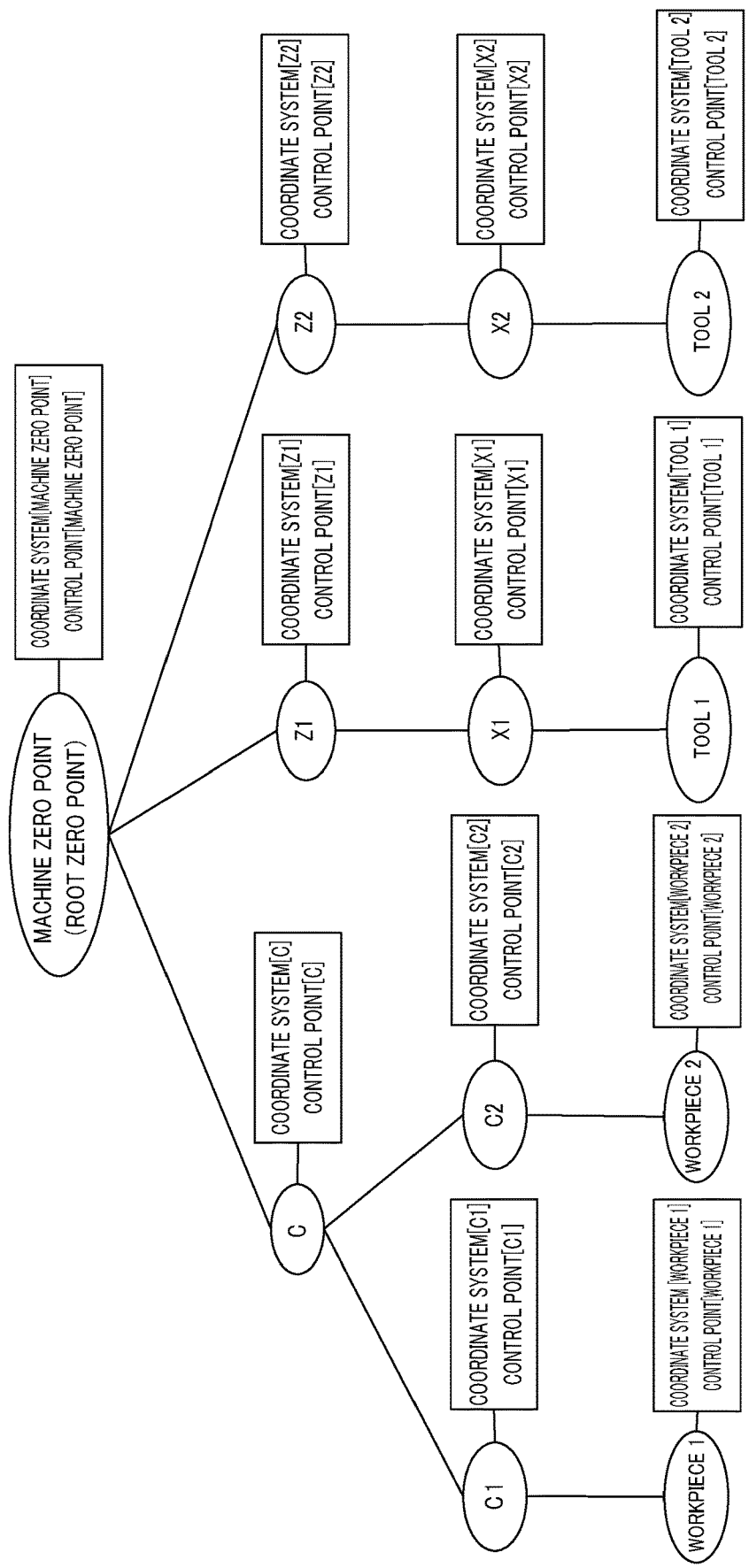
FIG. 16 is a diagram showing an example of the machine configuration tree into which the coordinate systems and the control points are inserted in the embodiment.

By the method described above, the machine configuration tree generation portion 21 inserts, as nodes, the control points and the coordinate systems into the individual nodes of the graph in the machine configuration. Although in the above description, the example where the control points and the coordinate systems are added as nodes is described, an embodiment is also possible in which, as shown in FIG. 16, the machine configuration tree generation portion 21 makes the individual nodes of the graph in the machine configuration have the control points and the coordinate systems as information.

<1. 5 Operation>

Figure 17:
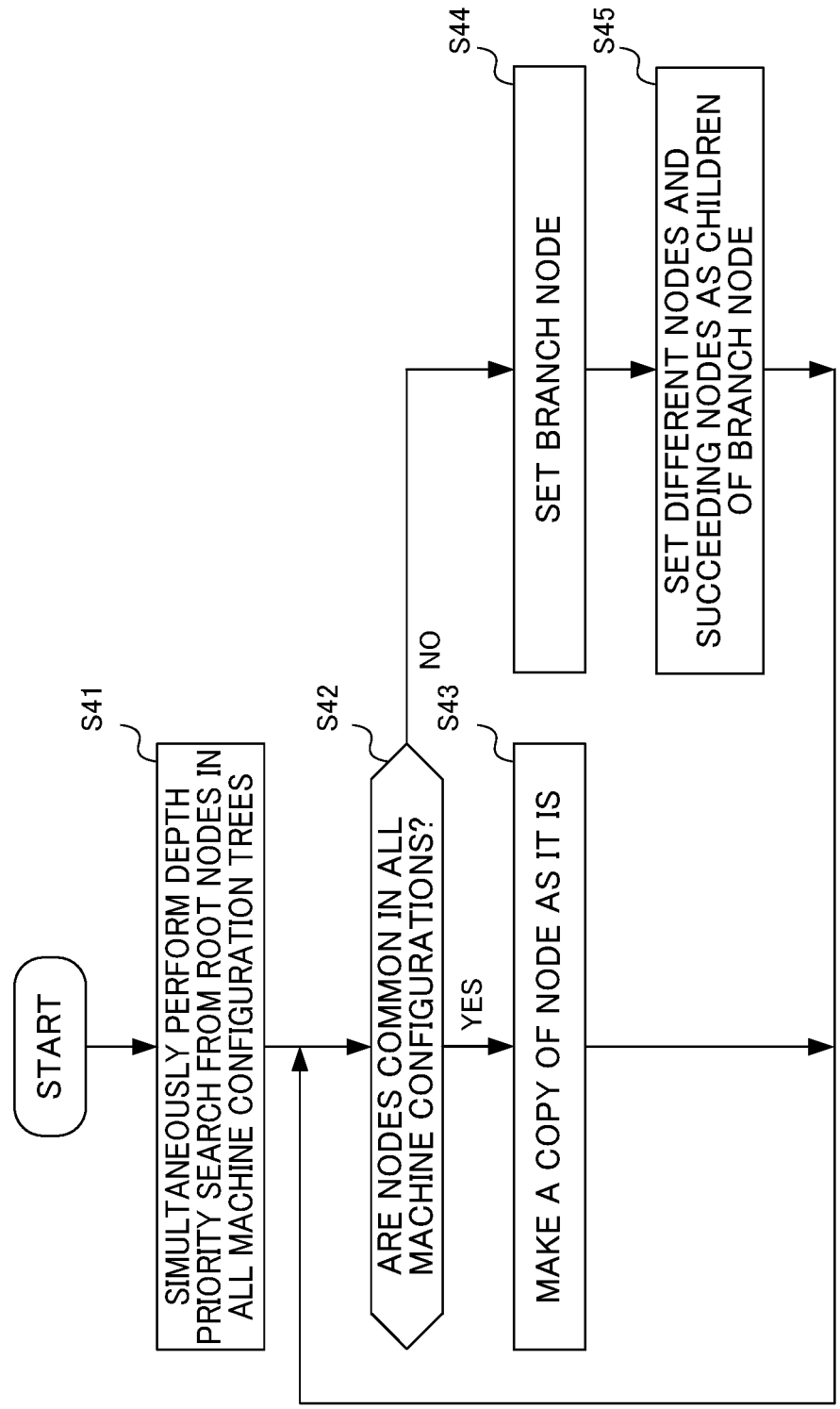
FIG. 17 is a flowchart showing the operation of the control system of the embodiment.

FIG. 17 is a flowchart showing an outline of the operation of the control system 1. In step S41, the branch node generation device 30 (machine configuration tree difference determination portion 31) simultaneously performs the depth priority search from the root nodes in all the machine configuration trees.

When, in step S42, nodes to be searched for are common in all the machine configuration trees (yes in S42), the processing is transferred to step S43. When a node to be searched for in any one machine configuration tree is different from other trees (no in S42), the processing is transferred to step S44.

In step S43, the machine configuration management device 20 (machine configuration tree generation portion 21) makes copies of the nodes as they are. Thereafter, the processing is transferred to step S42.

In step S44, the branch node generation device 30 (branch node generation portion 32) generates a branch node, and the branch node generation device 30 (branch node output portion 33) outputs the branch node to the machine configuration management device 20. The machine configuration management device 20 (node information change portion 22) then sets the branch node.

In step S45, the machine configuration management device 20 (node information change portion 22) sets different nodes as children of the branch node so as to branch from the branch node.

<1. 6 Effects>

The control system 1 according to the first embodiment is capable of providing a machine configuration with different constituent elements in a plurality of various machine configuration patterns in an easy-to-understand manner, and a user is thus able to easily select a desired machine configuration. Further, when a plurality of pieces of the data related to machine configuration need to be stored, the data to be stored can be reduced. In particular, as the number of patterns of the machine configuration increases, the effects allowing a user to easily understand different constituent elements and allowing the amount of data to be reduced become remarkable.

2 Second Embodiment

<2. 1 Overview>

In the control system according to the first embodiment, the branch node generation device 30 automatically generates a branch node and sets the branch node in a machine configuration tree. On the other hand, in the control system according to the second embodiment, a user manually and directly sets a branch node.

<2. 2 Configuration>

Figure 18:
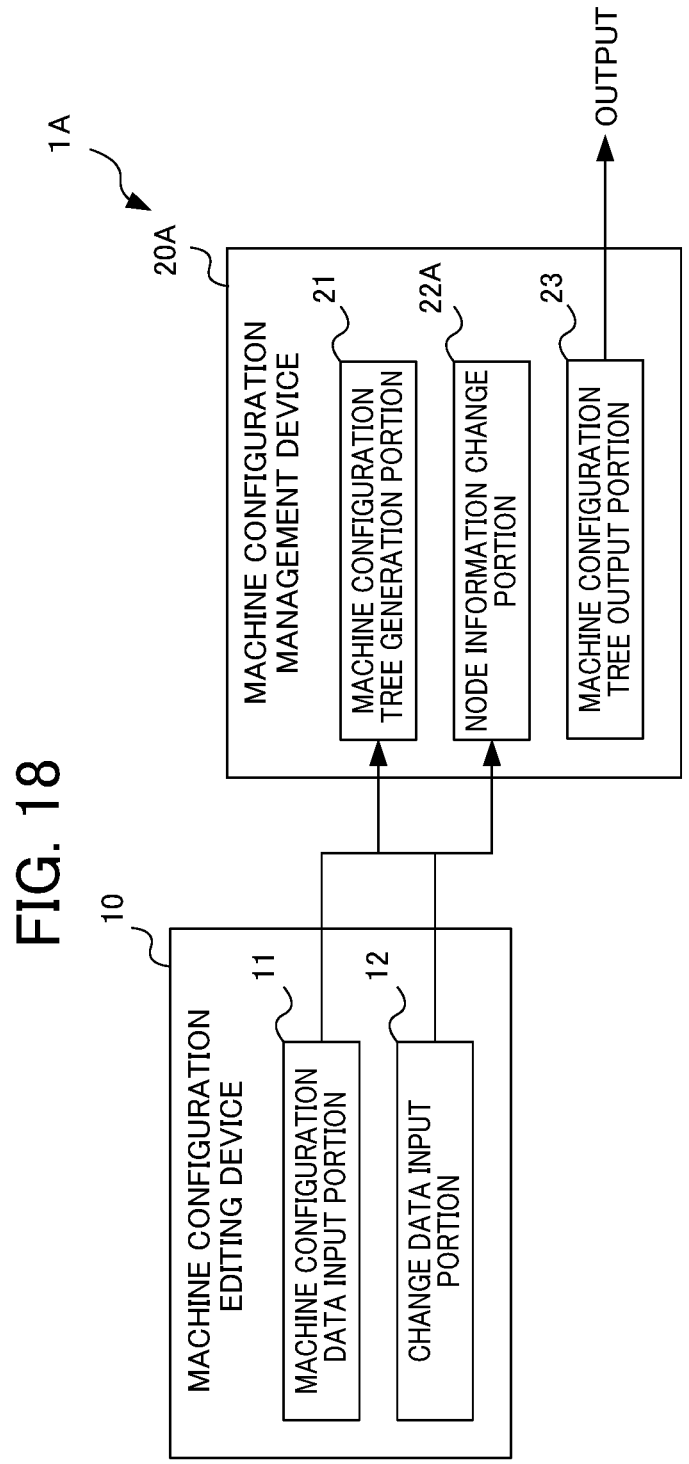
FIG. 18 is an overall configuration diagram of a control system of another embodiment.

FIG. 18 shows a control system 1A according to the second embodiment. In the control system 1A, unlike the control system 1, the branch node generation device 30 is not an essential constituent element. The control system 1A includes a machine configuration management device 20A instead of the machine configuration management device 20. The machine configuration management device 20A, unlike the machine configuration management device 20, includes a node information change portion 22A instead of the node information change portion 22.

In the control system 1A, since the branch node generation device 30 is not an essential constituent element, a branch node is not input to the node information change portion 22A by the branch node generation device 30. On the other hand, the node information change portion 22A generates a branch node on the basis of the change data itself input by the machine configuration editing device 10 (change data input portion 12) and sets the branch node in a machine configuration tree.

<2. 3 Effects>

In the control system 1A according to the second embodiment, a user manually and directly sets a branch node, and, accordingly, the branch node generation device 30 is not an essential constituent element. This enables to simplify the configuration of the control system 1A, and, accordingly, to realize the control system 1A at a low cost.

3 Third Embodiment

<3. 1 Overview>

Figure 19A:
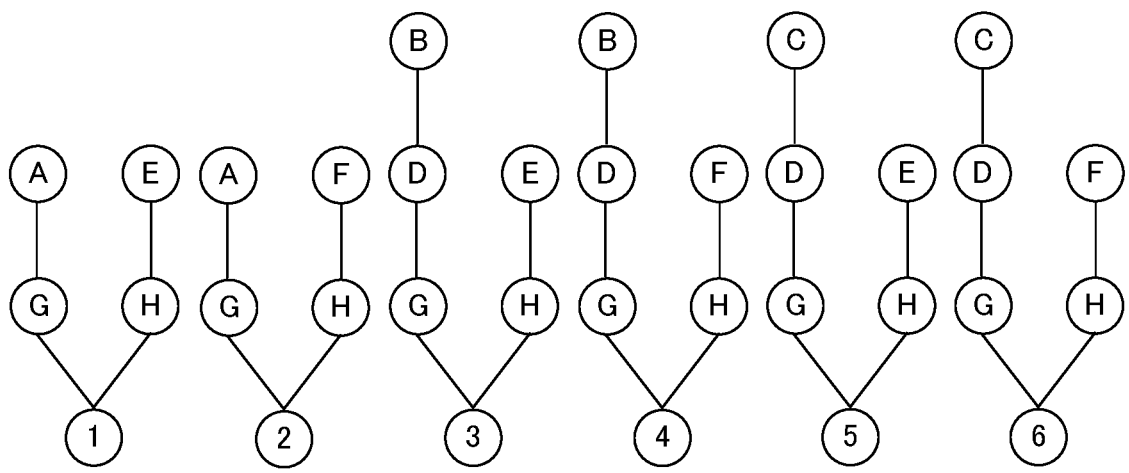
FIG. 19A is a diagram showing an outline of a control system of another embodiment.
Figure 19B:
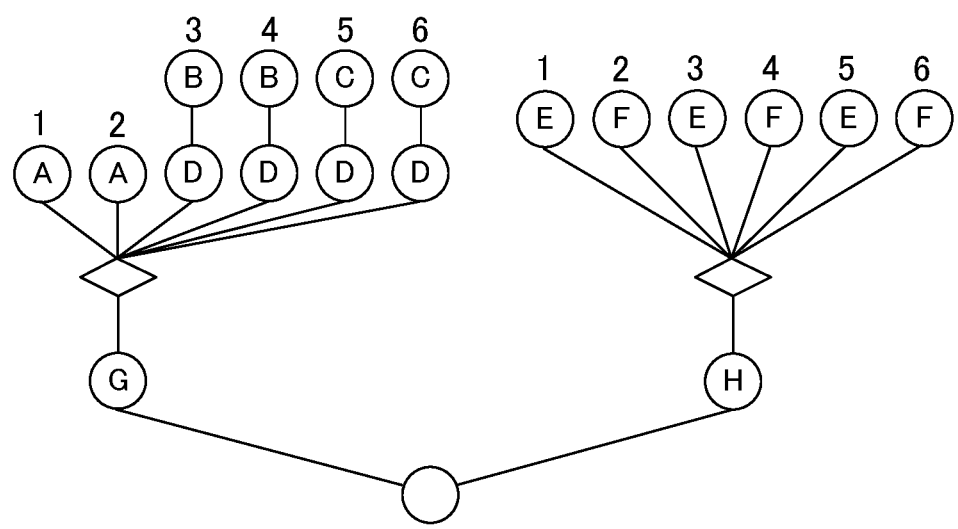
FIG. 19B is a diagram showing an outline of the control system of the embodiment.

The control system 1 according to the first embodiment, or the control system 1A according to the second embodiment, is capable of aggregating the six machine configuration trees shown in FIG. 19A into the single machine configuration tree shown in FIG. 19B.

More specifically, in the six machine configuration trees shown in FIG. 19A, a root node, a G axis, and an H axis are common, and thus these are set as common nodes. Furthermore, branch nodes are set adjacent to the respective common nodes in the tip directions, and the nodes (CASE nodes) different in the machine configuration trees are set at the tip of the respective branch nodes, whereby the single aggregated machine configuration tree shown in FIG. 19B is able to be generated. This enables to reduce the number of nodes from 34 in the six machine configuration trees to 21 in the single machine configuration tree.

The machine configuration tree in FIG. 19B has common nodes in the CASE nodes when comparing the CASE nodes to each other.

Figure 19C:
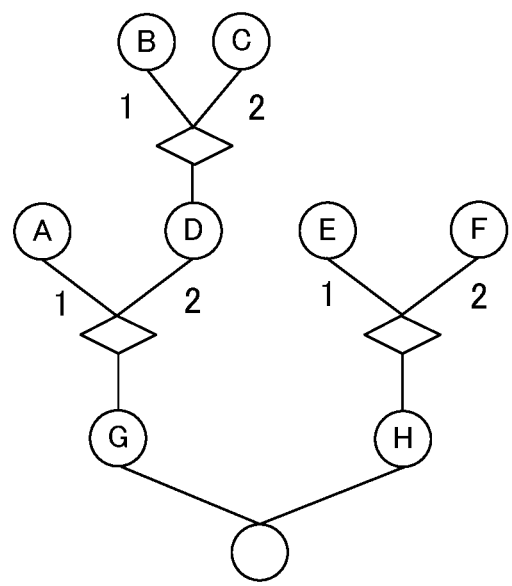
FIG. 19C is a diagram showing an outline of the control system of the embodiment.

Moreover, as shown in FIG. 19C, branch nodes are set above the branch nodes toward the tip directions; in other words, branch nodes are set in multiple stages. This enables to further reduce the number of nodes down to 12 in the single machine configuration tree.

Specifically, in the first and second embodiments, when the machine configuration tree difference determination portion 31 of the branch node generation device 30 finds out different nodes in the plurality of machine configuration machines in the depth priority search, the machine configuration tree difference determination portion 31 returns to the root nodes. However, in the third embodiment, unlike the first and second embodiments, the machine configuration tree difference determination portion 31, even when finding out different nodes, searches the machine configuration trees for a difference in the nodes to the tips without returning back to the root nodes. It is noted that the entire configuration of the control system according to the present embodiment is common to the configurations of the control system 1 according to the first embodiment and the control system 1A according to the second embodiment, and the descriptions thereof will thus be omitted.

<3. 2 Effects>

When a plurality of pieces of data related to the machine configuration needs to be stored, the control system of the present embodiment is capable of further reducing the data to be stored.

4 Fourth Embodiment

<4. 1 Overview>

Figure 20A:
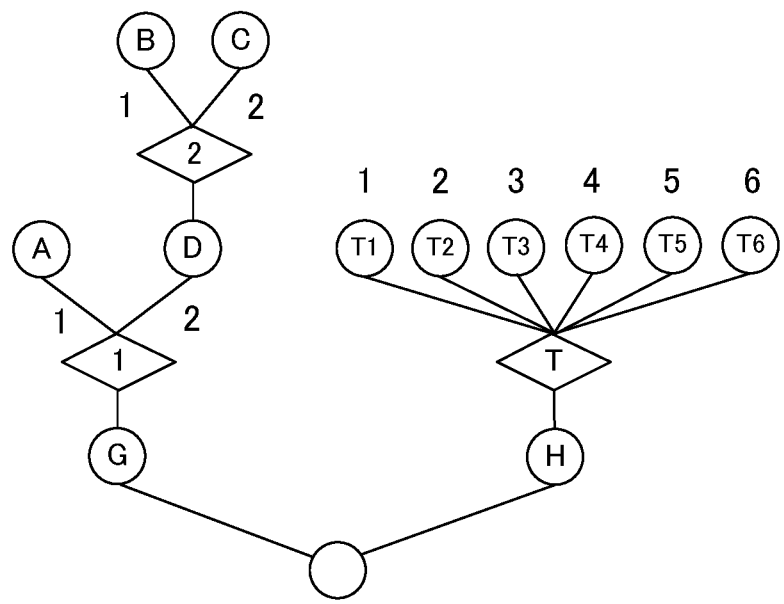
FIG. 20A is a diagram showing an outline of a control system of another embodiment.
Figure 20B:
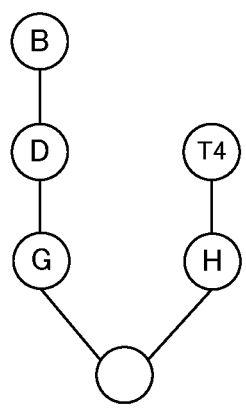
FIG. 20B is a diagram showing an outline of the control system of the embodiment.

Each of FIGS. 20A and 20B shows the outline of the fourth embodiment. In FIGS. 20A and 20B, "T" denotes a tool-dedicated branch node, and "T1," "T2," to "T6" respectively denote tool nodes.

As shown in FIG. 20A, the control system prepares a plurality of tool nodes and inputs tool management data such as of a tool type and a tool length compensation amount as attribute values to each of the tool nodes. The tool nodes are set so as to branch at a tool-dedicated branch node, and a command value of "T code" for tool selection is set as the branch command set in a command program. This allows a tool to be replaced and a tool length compensation amount to be changed.

For example, when a branch command to be set in a command program is set as:
(select1=2, select2=1, selectT=4),
the machine configuration of the machine configuration tree in FIG. 20B is able to be selected.

<4. 2 Configuration>

Figure 21:
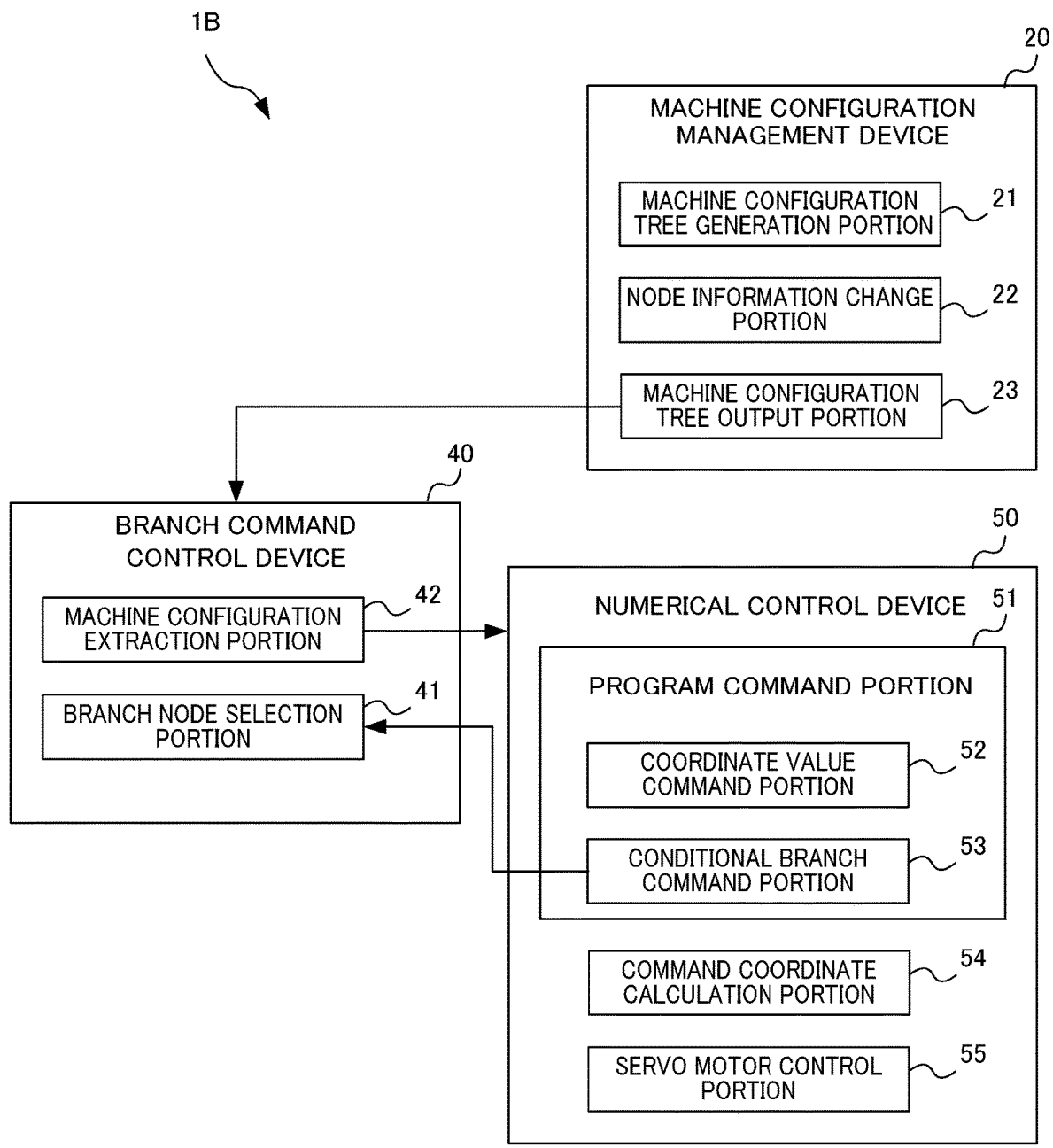
FIG. 21 is an overall configuration diagram of the control system of the embodiment.

FIG. 21 is the overall configuration diagram of a control system 1B according to the fourth embodiment. The control system 1B includes a branch command control device 40 and a numerical control device 50, in addition to the machine configuration management device 20.

The branch command control device 40 is configured to receive a command value for branching and extract the machine configuration after the branching. The branch command control device 40, as with the machine configuration management device 20 and the like, includes a control unit (not shown). The control unit, which is configured to control the entire branch command control device 40, reads out and executes various types of programs as needed from a storage area such as ROM, RAM, flash memory, or hard disk (HDD), to realize various functions in the present embodiment. The control unit may be a CPU. The control unit includes a branch node selection portion 41 and a machine configuration extraction portion 42.

The branch node selection portion 41 receives, from the numerical control device 50 (conditional branch command portion 53) which will be described later, a branch command for specifying a node to be selected at a branch node. The branch node selection portion 41 then selects the node in the machine configuration tree input by the machine configuration management device 20 (machine configuration tree output portion 23) on the basis of the branch command.

The machine configuration extraction portion 42 extracts the machine configuration after the branching from the machine configuration tree on the basis of the selected node.

The numerical control device 50 is configured to output the branch command for extracting the machine configuration for use from the machine configuration tree and control the machine tool on the basis of the extracted machine configuration input by the branch command control device. The numerical control device 50 includes a control unit (not shown), as with the machine configuration management device 20, the branch command control device 40, and the like.

The control unit, which is configured to control the entire numerical control device 50, reads out and executes various programs as needed from a storage area such as ROM, RAM, flash memory, or hard disk (HDD), to realize various functions in the present embodiment. The control unit may be a CPU. The control unit includes a program command portion 51, a command coordinate calculation portion 54, and a servo motor control portion 55.

The program command portion 51 interprets a machining program for performing machining by use of the machine tool and extracts a command from the machining program. The program command portion 51 includes a coordinate value command portion 52 and a conditional branch command portion 53.

The coordinate value command portion 52 generates a coordinate value command for specifying a coordinate value as a destination of each axis in order to perform machining by use of the machine tool.

The conditional branch command portion 53 generates a branch command for extracting the machine configuration corresponding to the generated coordinate value command from the machine configuration tree and outputs the branch command to the branch command control device 40 (branch node selection portion 41).

The command coordinate calculation portion 54 calculates a coordinate value as a destination for each axis of the machine tool to be controlled by using the machine configuration extracted by the branch command control device 40 (machine configuration extraction portion 42).

The servo motor control portion 55 receives the calculated value as a movement command amount for each axis calculated by the command coordinate calculation portion 54 and outputs a command for each axis to a servo motor (not shown).

<4. 3 Effects>

The control system according to the present embodiment allows an MTB or user to perform tool management in the same manner as the machine configuration management, resulting in enabling to save the user's labor in commanding.

5 Fifth Embodiment

<5. 1 Overview>

Figure 22A:
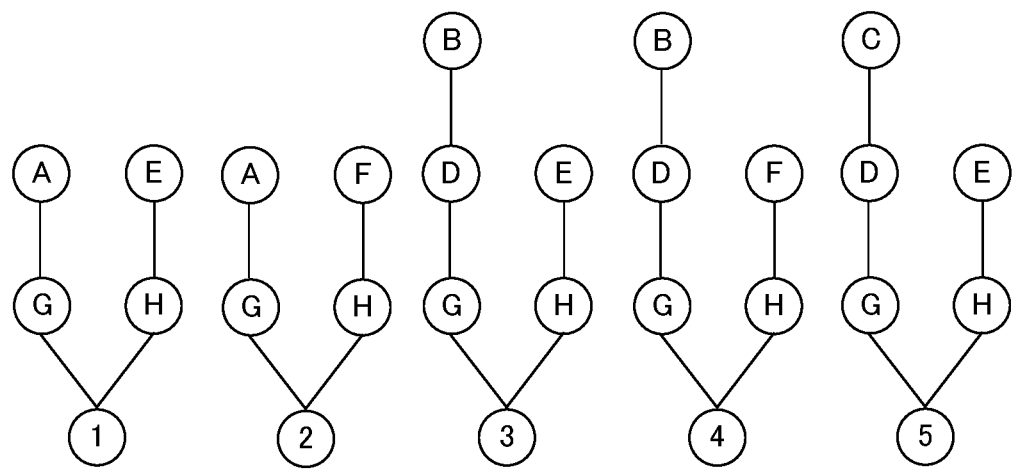
FIG. 22A is a diagram showing an outline of a control system of another embodiment.
Figure 22B:
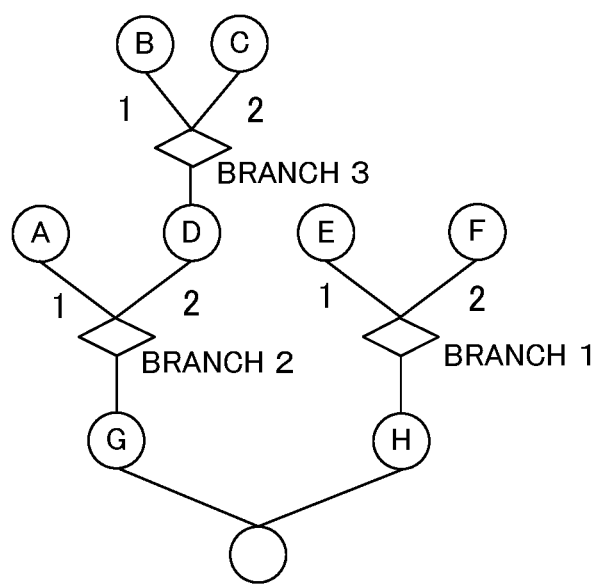
FIG. 22B is a diagram showing an outline of the control system of the embodiment.

Each of FIGS. 22A to 22D shows an outline of the fifth embodiment. The five machine configuration trees shown in FIG. 22A are able to be aggregated into the single machine configuration tree having branch nodes in multiple stages shown in FIG. 22B by use of the control system according to the third embodiment and the fourth embodiment. However, the machine configuration tree in which the set values of the branch nodes of a branch 1, a branch 2, and a branch 3 are all 2 in the single machine configuration tree shown in FIG. 22B, that is, the machine configuration tree in which the nodes connecting from a G axis in the upper direction are a D axis and a C axis and in which the nodes connecting from an H axis in the upper direction is an F axis is not included in the machine configuration trees in FIG. 22A.

Therefore, as shown in FIG. 22C, the branch command control device generates, after the generation of the machine configuration tree, for example, a table covering the machine configuration trees in all the patterns. When the numerical control device outputs a branch command to the branch command control device, the branch command control device collates set values for respective branch nodes included in the branch command with the values in the table in FIG. 22C to convert the set values into a pattern number.

As shown in FIG. 22D, when a pattern number for conversion is not present, the numerical control device issues an alarm.

<5. 2 Configuration>

Figure 23:
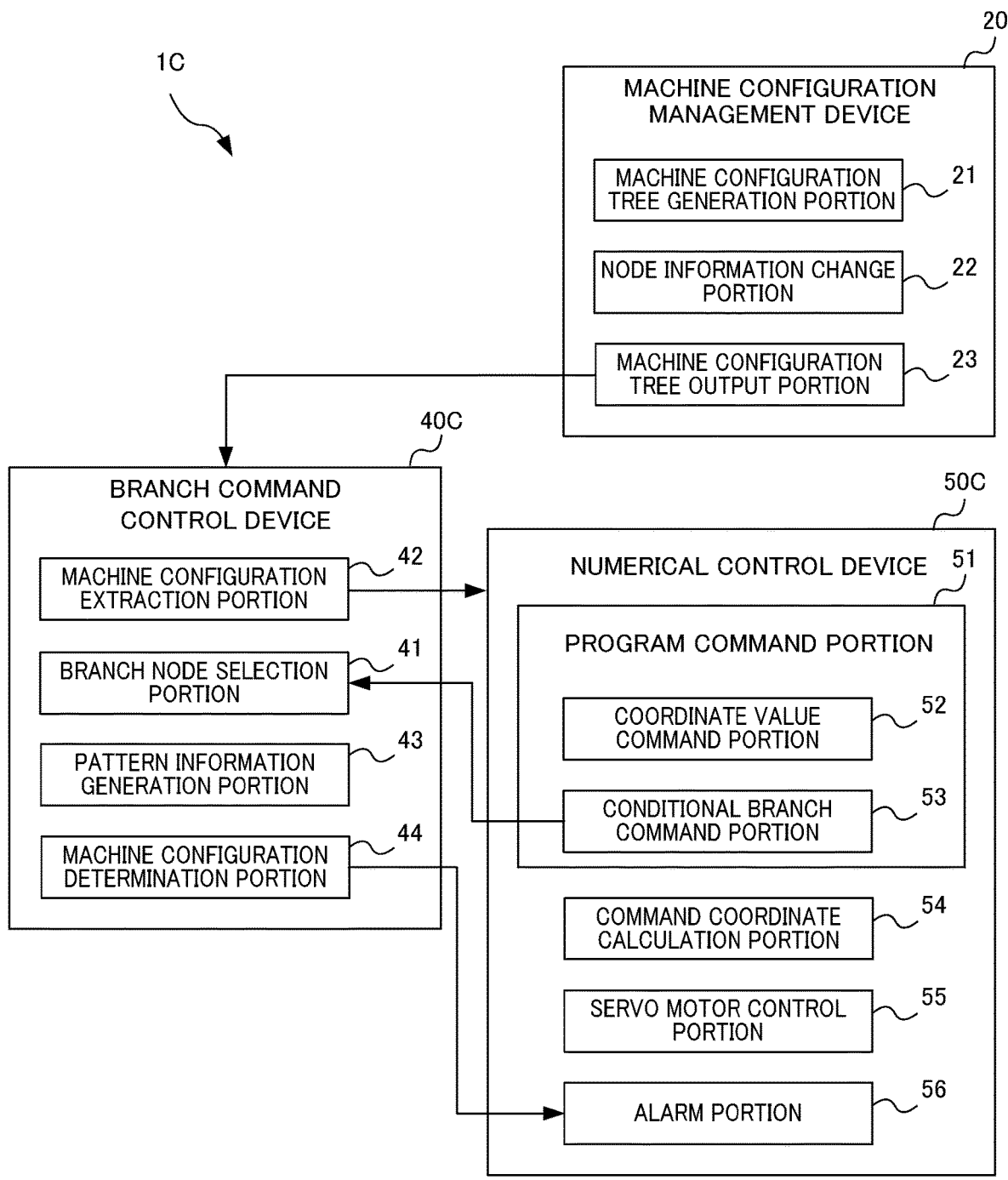
FIG. 23 is an overall configuration diagram of the control system of the embodiment.

FIG. 23 is an overall configuration diagram of a control system 1C according to the fifth embodiment. The control system 1C includes, as compared with the control system 1B, a branch command control device 40C instead of the branch command control device 40 and a numerical control device 50C instead of the numerical control device 50.

The branch command control device 40C includes, in addition to the constituent elements provided in the branch command control device 40, a pattern information generation portion 43 and a machine configuration determination portion 44.

The pattern information generation portion 43 generates the pattern information covering a plurality of machine configuration trees in all the patterns. The information may be, for example, the table shown in FIG. 22C.

The machine configuration determination portion 44 collates the branch command input by the numerical control device 50C with the pattern information to determine whether or not the branch command corresponds to a pattern included in the pattern information. The machine configuration determination portion 44 further outputs the determination result to the numerical control device 50C (alarm portion 56) which will be described later.

The numerical control device 50C includes an alarm portion 56, in addition to the constituent elements provided in the numerical control device 50.

The alarm portion 56 issues an alarm in the case where the branch command does not correspond to any pattern included in the pattern information on the basis of the determination result input by the branch command control device 40C (machine configuration determination portion 44).

<5. 3 Effects>

The control system according to the present embodiment allows a user who designates a machine configuration tree not subjected to setting, to recognize that the designation is incorrect.

6 Sixth Embodiment

<6. 1 Overview>

Figure 24:
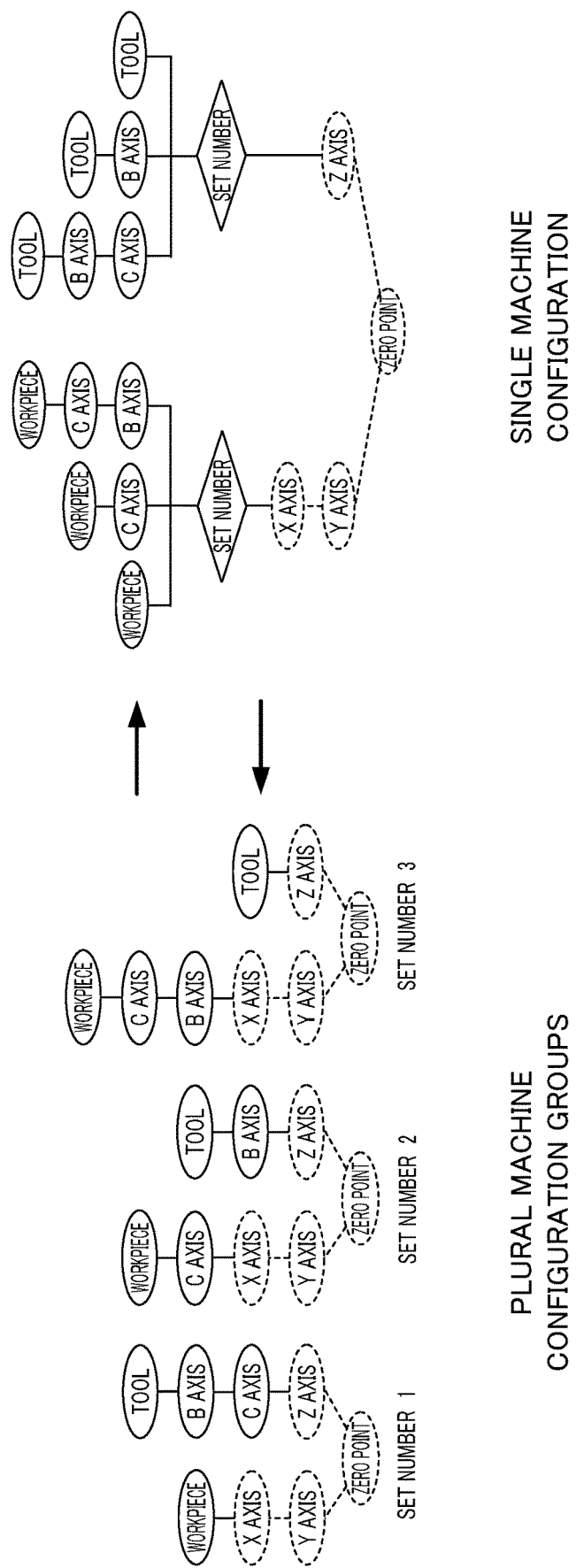
FIG. 24 is a diagram showing an outline of a control system of another embodiment.

FIG. 24 shows an outline of a control system according to the sixth embodiment. In the control system according to the sixth embodiment, in the case where a machine configuration with respect to a particular set number (pattern) is subjected to editing, addition, or deletion in a machine configuration tree including branch nodes, the display of the plurality of machine configuration trees serving as the basis and the display of the single machine configuration tree including branch nodes are switched therebetween, as shown in FIG. 24.

More specifically, when editing work is performed in the display of the single machine configuration, the editing work may be directly and manually performed as described in the second embodiment. On the other hand, when editing work is performed in the plural machine configuration groups display, the machine configuration editing device reconstructs and displays all the patterns of the machine configuration. After the editing work is completed, the branch node generation device 30 re-aggregates the machine configuration trees into the single machine configuration tree.

<6. 2 Configuration>

Figure 25:
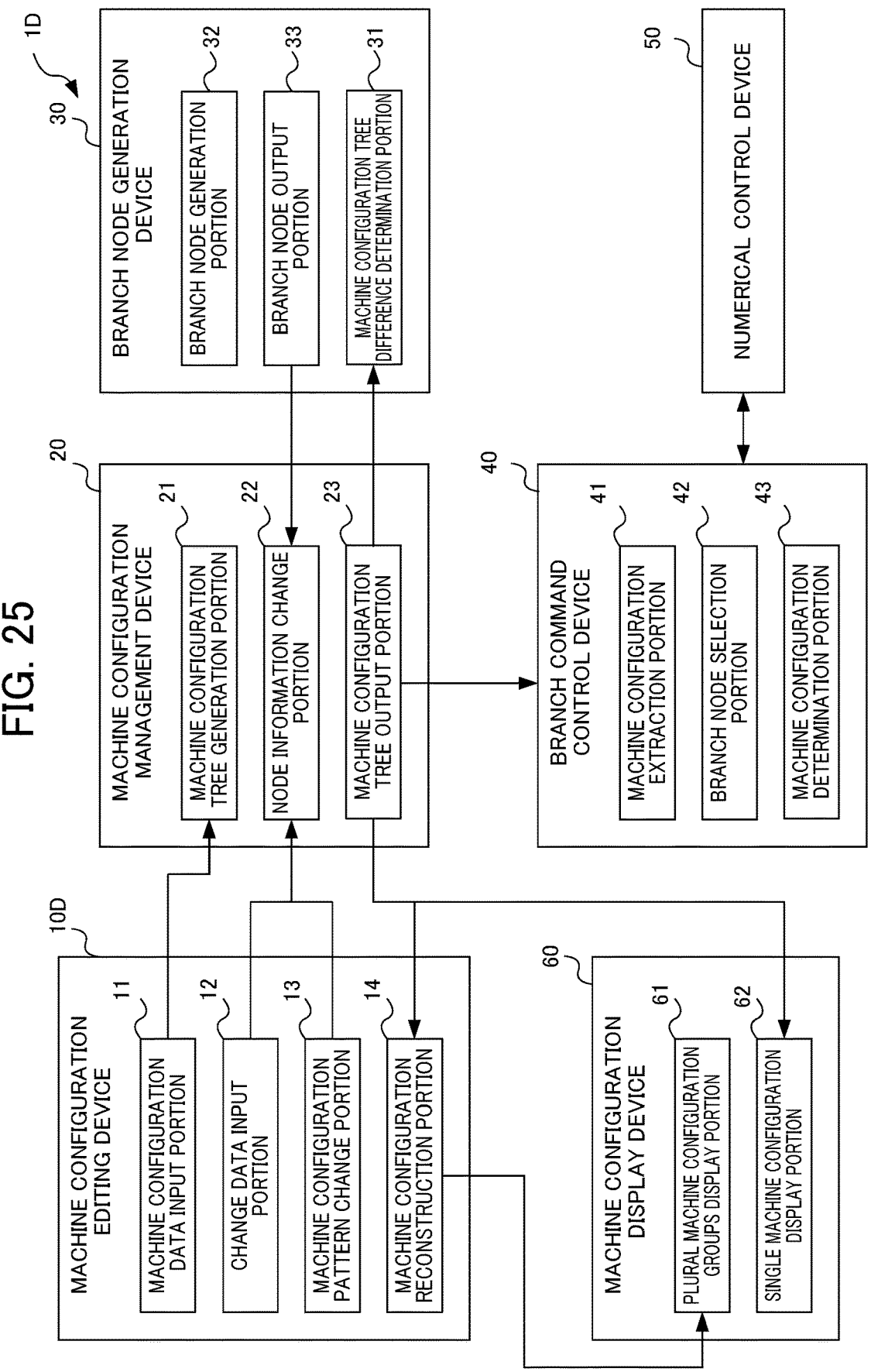
FIG. 25 is an overall configuration diagram of the control system of the embodiment.

FIG. 25 is an overall configuration diagram of a control system 1D according to the sixth embodiment. The control system 1D includes a machine configuration editing device 10D, the machine configuration management device 20, the branch node generation device 30, the branch command control device 40, the numerical control device 50, and a machine configuration display device 60.

The machine configuration editing device 10D includes a machine configuration reconstruction portion 14, in addition to the constituent elements provided in the machine configuration editing device 10.

The machine configuration reconstruction portion 14 reconstructs the machine configuration trees in all the patterns not including any branch node on the basis of the data of the machine configuration tree including branch nodes input by the machine configuration management device 20 (machine configuration tree output portion 23). The machine configuration reconstruction portion 14 further outputs the data of the machine configuration trees in all the patterns not including any branch node to the machine configuration display device 60 (plural machine configuration groups display portion 61) which will be described later.

The machine configuration display device 60 includes a plural machine configuration groups display portion 61 and a single machine configuration display portion 62.

The plural machine configuration groups display portion 61 displays the machine configuration trees in all the patterns not including any branch node input by the machine configuration editing device 10D (machine configuration reconstruction portion 14).

The single machine configuration display portion 62 displays the machine configuration tree including branch nodes input by the machine configuration management device 20 (machine configuration tree output portion 23).

<6. 3 Operation>

Figure 26:
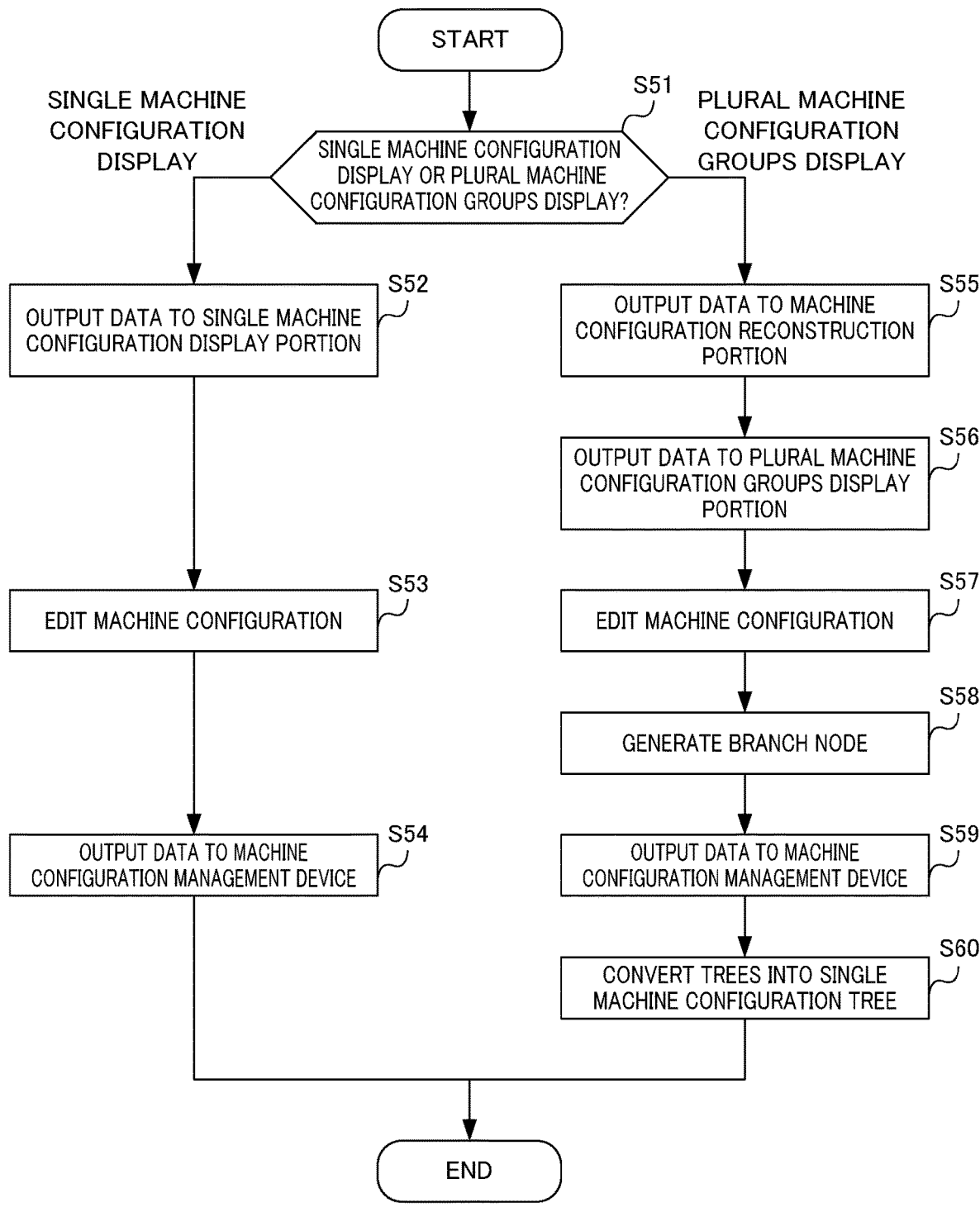
FIG. 26 is a flowchart showing the operation of the control system of the embodiment.
Figure 27:
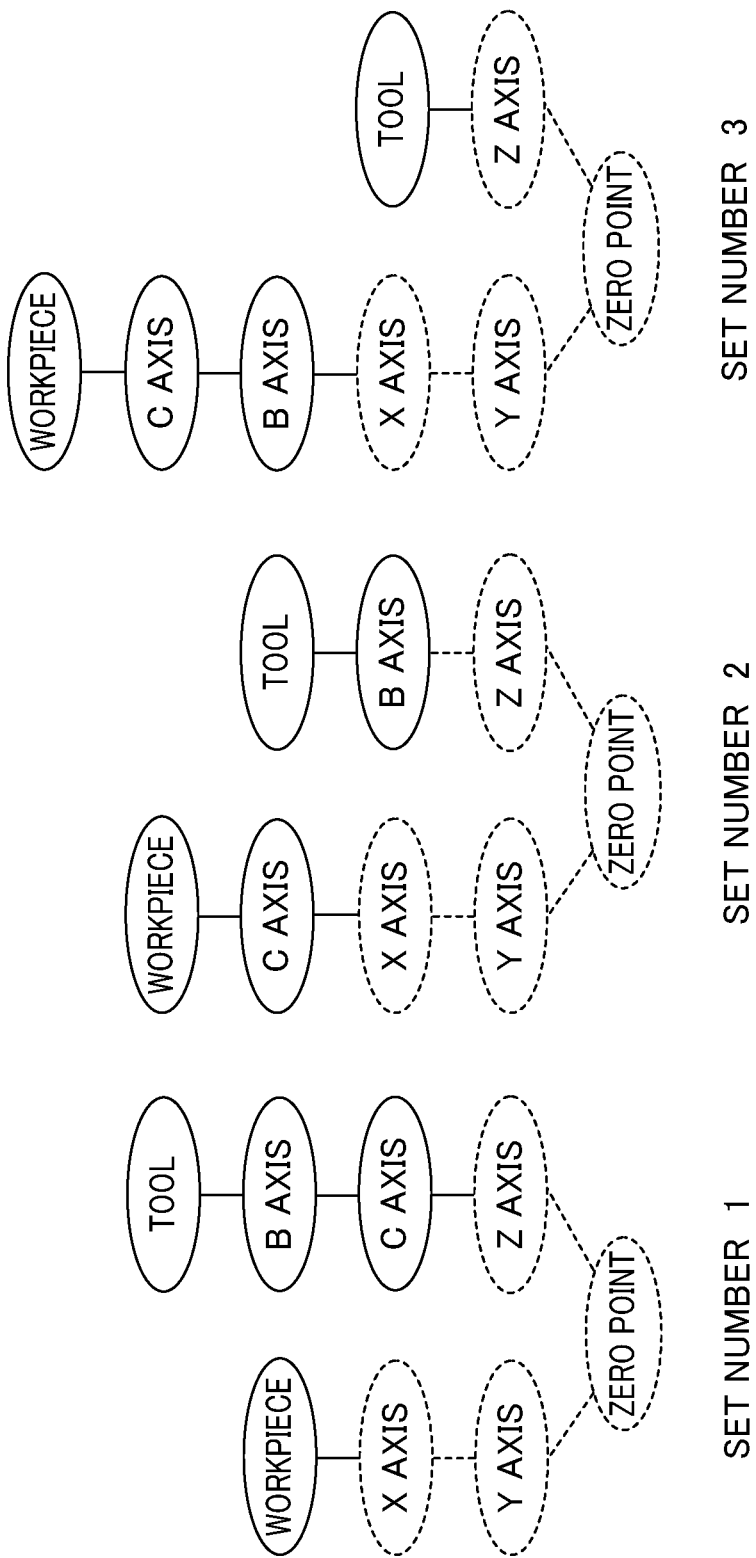
FIG. 27 is a diagram showing an example of a machine configuration tree in prior art.

FIG. 26 is a flowchart showing the operation of the control system 1D. In step S51, in the case where a single machine configuration is to be displayed (single machine configuration display in S51), the processing is transferred to step S52. In the case where plural machine configuration groups are to be displayed (plural machine configuration groups display in S51), the processing is transferred to step S55.

In step S52, the machine configuration management device 20 outputs the machine configuration data to the machine configuration display device 60 (single machine configuration display portion 62).

In step S53, the machine configuration editing device 10D (change data input portion 12, machine configuration pattern change portion 13) edits the machine configuration.

In step S54, the machine configuration data after the editing is output to the machine configuration management device 20 (node information change portion 22), and the processing is completed.

In step S55, the machine configuration management device 20 outputs the machine configuration data to the machine configuration editing device 10D (machine configuration reconstruction portion 14).

In step S56, the machine configuration management device 20 outputs the machine configuration data to the machine configuration display device 60 (plural machine configuration groups display portion 61).

In step S57, the machine configuration editing device 10D (change data input portion 12, machine configuration pattern change portion 13) edits the machine configuration.

In step S58, the branch node generation device 30 (branch node generation portion 32) generates a branch node.

In step S59, the branch node generation device 30 (branch node output portion 33) outputs the branch node to the machine configuration management device 20 (node information change portion 22).

In step S60, the machine configuration management device 20 (node information change portion 22) converts the plurality of machine configuration trees into the single machine configuration tree, and the processing is then completed.

<6. 4 Effects>

The control system according to the present embodiment allows a user to select, when editing the machine configuration tree, an easy-to-edit display method between the single machine configuration display and the plural machine configuration groups display.

7 Modifications

<7. 1 Modification 1>

For example, although FIG. 2 shows only the machine configuration editing device 10, the machine configuration management device 20, and the branch node generation device 30 as the control system 1 according to the first embodiment, the configuration is not limited thereto. The control system 1 may further include a branch command control device, a numerical control device, and a machine configuration display device.

Similarly, a control system according to each of the second to sixth embodiments may include a constituent element described in another embodiment in addition to the essential constituent elements in the control system of the own embodiment.

<7. 2 Modification 2>

Although, for example, the control system 1D is provided with the machine configuration editing device 10D, the machine configuration management device 20, the branch node generation device 30, the branch command control device 40, the numerical control device 50, and the machine configuration display device 60 respectively as separate devices, the configuration is not limited thereto. For example, the numerical control device 50 may incorporate, in the casing thereof, the machine configuration editing device 10D, the machine configuration management device 20, the branch node generation device 30, the branch command control device 40, and the machine configuration display device 60, whereby the control system 1D is realized in the same casing. The same applies to the control systems according to other embodiments.

<7. 3 Effects>

In the control systems according to the respective modifications, the control system is able to be provided flexibly in various configurations.

EXPLANATION OF REFERENCE NUMERALS 1 1A 1B 1C 1D CONTROL SYSTEM
10 10D MACHINE CONFIGURATION EDITING DEVICE
11 MACHINE CONFIGURATION DATA INPUT PORTION
12 CHANGE DATA INPUT PORTION
13 MACHINE CONFIGURATION PATTERN CHANGE PORTION
14 MACHINE CONFIGURATION RECONSTRUCTION PORTION
20 MACHINE CONFIGURATION MANAGEMENT DEVICE
21 MACHINE CONFIGURATION TREE GENERATION PORTION
22 NODE INFORMATION CHANGE PORTION
23 MACHINE CONFIGURATION TREE OUTPUT PORTION
30 BRANCH NODE GENERATION DEVICE
31 MACHINE CONFIGURATION TREE DIFFERENCE DETERMINATION PORTION
32 BRANCH NODE GENERATION PORTION
33 BRANCH NODE OUTPUT PORTION
40 BRANCH COMMAND CONTROL DEVICE
41 BRANCH NODE SELECTION PORTION
42 MACHINE CONFIGURATION EXTRACTION PORTION
43 PATTERN INFORMATION GENERATION PORTION
44 MACHINE CONFIGURATION DETERMINATION PORTION
50 NUMERICAL CONTROL DEVICE
51 PROGRAM COMMAND PORTION
52 COORDINATE VALUE COMMAND PORTION
53 CONDITIONAL BRANCH COMMAND PORTION
54 COMMAND COORDINATE CALCULATION PORTION
55 SERVO MOTOR CONTROL PORTION
56 ALARM PORTION
60 MACHINE CONFIGURATION DISPLAY DEVICE
61 PLURAL MACHINE CONFIGURATION GROUPS DISPLAY PORTION
62 SINGLE MACHINE CONFIGURATION DISPLAY PORTION

What is claimed is:

1. A control system for an industrial machine, the control system comprising a machine configuration editing device and a machine configuration management device, and the control system configured to represent a machine configuration to be controlled in a graph-like machine configuration tree having constituent elements as nodes, wherein
   the machine configuration editing device acquires machine configuration data for generating the machine configuration tree, and wherein
   the machine configuration management device includes:
   a machine configuration tree generation portion configured to generate a plurality of the machine configuration trees on a basis of the machine configuration data; and
   a node information change portion configured to generate a single machine configuration tree having a branch node set at a position corresponding to a boundary between common nodes and different nodes in the plurality of machine configuration trees, and having the different nodes in the plurality of machine configuration trees so as to branch from the branch node toward tips.

2. The control system according to claim 1, wherein the machine configuration editing device includes:
   a machine configuration data input portion configured to input the machine configuration data corresponding to any one machine configuration tree in the plurality of machine configuration trees; and
   a change data input portion configured to input change data corresponding to a machine configuration different from the one machine configuration tree, in each of the plurality of machine configuration trees.

3. The control system according to claim 1, the control system further comprising a branch node generation device, wherein
the branch node generation device includes:
a machine configuration tree difference determination portion configured to simultaneously search the plurality of machine configuration trees for the nodes from root nodes to determine the different nodes;
a branch node generation portion configured to generate the branch node to be set between the common nodes and the different nodes; and
a branch node output portion configured to output the generated branch node to the node information change portion.

4. The control system according to claim 3, wherein
the node information change portion sets the branch nodes in multiple stages.

5. The control system according to claim 1, the control system further comprising a numerical control device and a branch command control device, wherein
the numerical control device includes:
a conditional branch command portion configured to output a branch command for specifying a node to be selected as a succeeding node at the branch node, and wherein
the branch command control device includes:
a branch node selection portion configured to select a node from the machine configuration trees input by the machine configuration management device on a basis of the branch command; and
a machine configuration extraction portion configured to partially extract a machine configuration from the machine configuration trees on a basis of the selected node.

6. The control system according to claim 5, wherein
a tool node corresponding to a tool is set at the tip of the branch node,
information related to a type of the tool and information related to a tool length compensation amount of the tool are inserted into the tool node, and wherein
one tool is selected from a plurality of the tools on the basis of the branch command, and the tool length compensation amount is changed.

7. The control system according to claim 5, wherein
the branch command control device includes:
a pattern information generation portion configured to generate pattern information covering the plurality of machine configuration trees in all patterns; and
a machine configuration determination portion configured to collate the branch command with the pattern information to determine whether or not the branch command corresponds to a pattern included in the pattern information, and wherein
the numerical control device includes:
an alarm portion configured to issue an alarm when the branch command does not correspond to any pattern included in the pattern information.

8. The control system according to claim 1, the control system further comprising a machine configuration display device, wherein
the machine configuration editing device includes:
a machine configuration pattern change portion configured to output, to the node information change portion, a change command for switching display by the machine configuration display device between the machine configuration tree including the branch node and the plurality of machine configuration trees not including any branch node but corresponding to the machine configuration tree; and
a machine configuration reconstruction portion configured to reconstruct the machine configuration trees in all patterns not including any branch node on a basis of the machine configuration tree including the branch node input by the machine configuration management device, and wherein
the machine configuration display device includes:
a single machine configuration display portion configured to display the machine configuration tree including the branch node input by the machine configuration management device; and
a plural machine configuration groups display portion configured to display the machine configuration trees not including any branch node in all the patterns, input by the machine configuration reconstruction portion.

* * * * *